(12) United States Patent
Martinazzi et al.

(10) Patent No.: US 11,360,637 B1
(45) Date of Patent: *Jun. 14, 2022

(54) TECHNIQUES TO CONFIGURE THE NETWORK DISTRIBUTION OF MEDIA COMPOSITIONS FOR RECEPTION

(71) Applicant: META PLATFORMS, INC., Menlo Park, CA (US)

(72) Inventors: Peter Henry Martinazzi, Huntington Beach, CA (US); Richard Kenneth Zadorozny, Menlo Park, CA (US); Jennifer A. Burge, Oakland, CA (US); Christian Xavier Dalonzo, San Francisco, CA (US)

(73) Assignee: META PLATFORMS, INC., Menlo Park, CA (US)

( * ) Notice: Subject to any disclaimer, the term of this patent is extended or adjusted under 35 U.S.C. 154(b) by 483 days.

This patent is subject to a terminal disclaimer.

(21) Appl. No.: 16/380,000

(22) Filed: Apr. 10, 2019

Related U.S. Application Data

(63) Continuation of application No. 14/943,807, filed on Nov. 17, 2015, now Pat. No. 10,305,838.

(51) Int. Cl.
*G06F 3/04817* (2022.01)
*G06F 3/0481* (2022.01)
(Continued)

(52) U.S. Cl.
CPC ........ *G06F 3/04817* (2013.01); *G06F 3/0481* (2013.01); *H04L 51/00* (2013.01);
(Continued)

(58) Field of Classification Search
CPC ... G06F 3/0481; G06F 3/04817; H04L 51/22; H04L 51/36; H04L 51/28; H04L 51/00;
(Continued)

(56) References Cited

U.S. PATENT DOCUMENTS

| | | |
|---|---|---|
| 2004/0135816 A1 | 7/2004 | Schwartz et al. |
| 2006/0209690 A1 | 9/2006 | Brooke |

(Continued)

*Primary Examiner* — Ting Z Lee
(74) *Attorney, Agent, or Firm* — KDB Firm, PLLC

(57) ABSTRACT

Techniques to configure the network distribution of media compositions for reception are described. An apparatus may comprise a user interface component operative to display a messaging interface in association with a first user account with a messaging system, the messaging interface comprising a visual indicator for a second user account with the messaging system, the visual indicator comprising a media composition availability indicator, the media composition availability indicator associated with an inclusion of the first user account in a media composition distribution group for the second user account; receive a user selection of the media composition availability indicator in the messaging interface; and display the media composition in response to the user selection of the media composition availability indicator; and a messaging component operative to receive a media composition package associated with the first user account, the media composition package comprising the media composition. Other embodiments are described and claimed.

17 Claims, 15 Drawing Sheets

(51) Int. Cl.
*H04L 51/00* (2022.01)
*H04L 51/10* (2022.01)
*H04L 51/08* (2022.01)
*H04L 51/42* (2022.01)
*H04L 51/56* (2022.01)
*H04L 51/48* (2022.01)
*H04L 51/52* (2022.01)

(52) U.S. Cl.
CPC .............. *H04L 51/08* (2013.01); *H04L 51/10* (2013.01); *H04L 51/16* (2013.01); *H04L 51/22* (2013.01); *H04L 51/28* (2013.01); *H04L 51/32* (2013.01); *H04L 51/36* (2013.01)

(58) Field of Classification Search
CPC ......... H04L 51/10; H04L 51/32; H04L 51/08; H04L 51/16
See application file for complete search history.

(56) References Cited

U.S. PATENT DOCUMENTS

| | | |
|---|---|---|
| 2008/0155471 A1 | 6/2008 | Lynn et al. |
| 2009/0160876 A1 | 6/2009 | King et al. |
| 2012/0173636 A1 | 7/2012 | OSullivan et al. |
| 2012/0185797 A1* | 7/2012 | Thorsen ................. G06Q 10/00 715/784 |
| 2015/0025882 A1* | 1/2015 | Park ....................... H04L 51/10 704/235 |
| 2015/0215241 A1 | 7/2015 | Zhou |
| 2015/0215253 A1 | 7/2015 | Vemuri et al. |
| 2015/0295878 A1 | 10/2015 | Bender et al. |
| 2016/0014064 A1 | 1/2016 | Harper et al. |
| 2016/0034469 A1 | 2/2016 | Livingston et al. |
| 2018/0097940 A1 | 4/2018 | Beilis et al. |
| 2018/0234373 A1* | 8/2018 | Tai .......................... H04L 51/18 |

\* cited by examiner

600

```
Receive a media composition via a composition interface of a
messaging client on a client device, the messaging client
associated with a user account with a messaging system.
602
```

```
Receive a transmission command via the composition
interface.
604
```

```
Transmit a media composition package from the client device
to the messaging system in response to the transmission
command, the media composition package comprising the
media composition, the media composition package addressed
to a media composition distribution group for the user
account.
606
```

Display a messaging interface in association with a first user account with a messaging system, the messaging interface comprising a visual indicator for a second user account with the messaging system, the visual indicator comprising a media composition availability indicator, the media composition availability indicator associated with an inclusion of the first user account in a media composition distribution group for the second user account.
652

Receive a user selection of the media composition availability indicator in the messaging interface.
654

Receive a media composition package associated with the second user account, the media composition package comprising a media composition.
656

Display the media composition in response to the user selection of the media composition availability indicator.
658

TECHNIQUES TO CONFIGURE THE NETWORK DISTRIBUTION OF MEDIA COMPOSITIONS FOR RECEPTION

RELATED APPLICATIONS

This application is a continuation of, claims the benefit of and priority to previously filed U.S. patent application Ser. No. 14/943,807 filed Nov. 17, 2015, titled "Techniques to Configure the Network Distribution of Media Compositions for Reception", which is hereby incorporated by reference in its entirety.

This application is related to U.S. patent application Ser. No. 14/943,822 filed Nov. 17, 2015, titled "Techniques to Configure the Network Distribution of Media Compositions for Transmission", which is hereby incorporated by reference in its entirety.

BACKGROUND

Users may interact with each other in a messaging system, sending messages back and forth to each other in a text-based conversation between two or more users. A user may have a user account associated with them in the messaging system, the user account providing an online identity for the user, a destination for messages directed to the user, and generally coordinating the user's access to and use of the messaging system. A user may access the messaging system from a variety of endpoints, including mobile devices (e.g., cellphones), desktop computers, web browsers, specialized messaging clients, etc.

SUMMARY

The following presents a simplified summary in order to provide a basic understanding of some novel embodiments described herein. This summary is not an extensive overview, and it is not intended to identify key/critical elements or to delineate the scope thereof. Some concepts are presented in a simplified form as a prelude to the more detailed description that is presented later.

Various embodiments are generally directed to techniques to configure the network distribution of media compositions. Some embodiments are particularly directed to techniques to configure the network distribution of media compositions based on social networking information. In one embodiment, for example, an apparatus may comprise a user interface component of a messaging client on a client device operative to receive a media composition via a composition interface, the messaging client associated with a user account with a messaging system; and receive a transmission command via the composition interface; and a messaging component operative to transmit a media composition package from the client device to the messaging system in response to the transmission command, the media composition package comprising the media composition, the media composition package addressed to a media composition distribution group for the user account, the media composition distribution group determined based on, at least in part, a messaging history for the user account with the messaging system.

In another embodiment, for example, an apparatus may comprise a user interface component operative to display a messaging interface in association with a first user account with a messaging system, the messaging interface comprising a visual indicator for a second user account with the messaging system, the visual indicator comprising a media composition availability indicator, the media composition availability indicator associated with an inclusion of the first user account in a media composition distribution group for the second user account, the media composition availability indicator comprising at least in part a preview of a media composition; receive a user selection of the media composition availability indicator in the messaging interface; and display the media composition in response to the user selection of the media composition availability indicator; and a messaging component operative to receive a media composition package associated with the first user account, the media composition package comprising the media composition. Other embodiments are described and claimed.

To the accomplishment of the foregoing and related ends, certain illustrative aspects are described herein in connection with the following description and the annexed drawings. These aspects are indicative of the various ways in which the principles disclosed herein can be practiced and all aspects and equivalents thereof are intended to be within the scope of the claimed subject matter. Other advantages and novel features will become apparent from the following detailed description when considered in conjunction with the drawings.

BRIEF DESCRIPTION OF THE DRAWINGS

FIG. 6A illustrates an embodiment of a first logic flow for the system of FIG. 1.

FIG. 6B illustrates an embodiment of a second logic flow for the system of FIG. 1.

DETAILED DESCRIPTION

Figure 1:
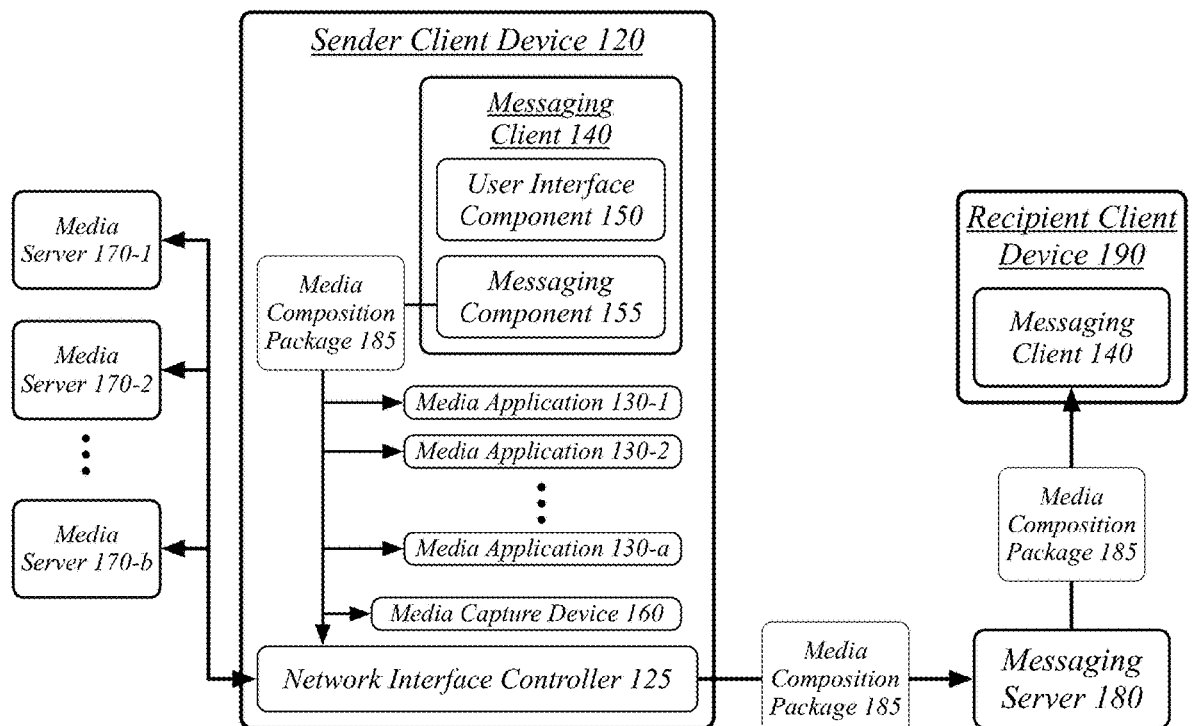
FIG. 1 illustrates an embodiment of a media distribution system.

Users of a messaging system may interact with each other using, at least in part, media content, such as images, animated images, video, audio, and other media items. Users may transmit media content in individual (i.e., one-on-one) or group conversation. Similarly, users may transmit media content as a broadcast to a broad group of friends, associates, and other relations that they may have in a messaging system, particularly where a messaging system is a component of a social-networking system supporting the registration of social relationships.

However, users may benefit from a distribution channel for media content in which the audience for the content is determined based on the distributing user's messaging relationships. By using a channel distinct from a user's friend list, a user may gain a channel that is more personal and refined than their general group of friends. By using a channel distinct from message threads, a user may present content to those they message while avoiding the command for attention that may be associated with sending a message to one or more users.

Further, the media distributed via a composition channel may be displayed in association with the user in a messaging interface to promote the discovery of a user's compositions in association with messaging interaction with that user. This may encourage the distribution of media that is selected to compliment messaging relationships. Users may distribute media content that specifically highlights the context with which they engage in their friends and the distribution of the media content may promote messaging interactions in relation to the distributed media content.

For example, a user may distribute a composition comprising a photo of a ticket stub for a film, play, concert, sporting event, or other performance for which they are currently in line awaiting entry. Other users viewing the photo may be encouraged to engage with the distributing user about the event they are about to attend. By not sending the photo to a particular message thread, the distributing user may be empowered to allow other users to come to them to comment on their photo and the event. The compositions may be distributed in a non-interruptive manner, without the use of push notifications, so that compositions are discovered at the time a user goes to engage with another user, rather than being notified when they are busy at other tasks. By not posting the photo to a general distribution to their friend list, a user may feel comfortable increasing the frequency with which they distribute such media, knowing that media which may, in some cases, represent smaller life moments will only be promoted to those with whom they regularly engage.

In general, a composition channel direct to a distribution group generated based on a user's messaging relationships may serve to create an online equivalent to the context generally received in in-person interactions. These may reflect what activities a user has recently been engaged in, a user's mood, what's on the user's mind, or other context relevant to conversation. To serve these ends, the user creating and distributing the compositions may provided with tools to shape their distribution group, be aware of their distribution group, and be encouraged by the responses that they receive to their contributions. As a result, the embodiments can improve a user's experience in distribution media content through a messaging system and can increase a user's engagement with a messaging system thanks to the addition of a different distribution channel that accommodates a different approach to the distribution of media.

Reference is now made to the drawings, wherein like reference numerals are used to refer to like elements throughout. In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives consistent with the claimed subject matter.

It is worthy to note that "a" and "b" and "c" and similar designators as used herein are intended to be variables representing any positive integer. Thus, for example, if an implementation sets a value for a=5, then a complete set of components 122 illustrated as components 122-1 through 122-*a* may include components 122-1, 122-2, 122-3, 122-4 and 122-5. The embodiments are not limited in this context.

FIG. 1 illustrates a block diagram for a media distribution system 100. In one embodiment, the media distribution system 100 may comprise a computer-implemented system having software applications comprising one or more components. Although the media distribution system 100 shown in FIG. 1 has a limited number of elements in a certain topology, it may be appreciated that the media distribution system 100 may include more or less elements in alternate topologies as desired for a given implementation.

A user's access to a media distribution system 100 may be a messaging client 140 installed as a user application on a client device, such as sender client device 120 or recipient client device 120, and executing locally on the client device. In some cases, the messaging client 140 may include other functionality. For example, the messaging client 140 may be a front-end to a social-networking service, providing messaging services in association with the social-networking service. In many cases, a client device may be a smartphone, cell phone, or other mobile device using a mix of Wi-Fi and cellular data networks to access the Internet and networked resources, though it will be appreciated that any form of network access may be used. For example, one device may tether to another, such as a smart watch tethering to a Internet-capable device (e.g., mobile phone, personal computer) or a mobile phone tethering to a personal computer. A client device may execute a plurality of applications, including the messaging client 140, one or more media applications 130, and other user applications. In other embodiments, however, the client device may comprise a personal computer device, a portable digital assistant, a tablet device, or any other form of computing device. Similarly, in some situations and embodiments, a user may access the media distribution system 100 via a web portal, with the messaging client 140 executing as a web-based application.

A client device may communicate with other devices using wireless transmissions to exchange network traffic. Exchanging network traffic, such as may be included in the exchange of messaging transactions, may comprise transmitting and receiving network traffic via a network interface controller 125 (NIC). A NIC comprises a hardware component connecting a computer device, such as client device, to a computer network. The NIC may be associated with a software network interface empowering software applications to access and use the NIC. Network traffic may be received over the computer network as signals transmitted over data links. The network traffic may be received by capturing these signals and interpreting them. The NIC may receive network traffic over the computer network and transfer the network traffic to memory storage accessible to software applications using a network interface application programming interface (API). The network interface controller 125 may be used for the network activities of the embodiments described herein, including the interoperation of the media applications 130, media servers 170, messaging client 140, and messaging server 180 through network communication. For example, the messaging client 140 transmitting or receiving a media composition package 185 to or from a messaging server 180 may be interpreted as using the network interface controller 125 for network access to a communications network for the transmission or reception of information.

The media applications 130 may comprise applications for one or more of searching media content, discovering media content, sharing media content, storing media content, accessing media content, modifying media content, and combining media content. Each of the media applications may be associated one or more media services, either a dedicated media application for a particular media service or a media application interoperating with a plurality of media services. Each of the media services may provide one or more media servers 170 for storing, retrieving, and generally exchanging media content. In some embodiments, one or more of the media servers 170 may be internal to a messaging system, with the messaging system providing media content that may be intermingled with media content from third-party media services providing other media content. The media servers 170 may distribute media packages to the local media applications 130, the media packages comprising one or more media items and associated information.

The client device 120 may include a media capture device 160. The media capture device 160 may comprise a camera operative to capture one or both of still images and moving images (i.e., video) and/or a microphone operative to capture audio either or both of in isolation or in synchronization with the capture of moving images (i.e., film with sound). The media capture device 160 may provide media capture data to the messaging client 140, the media capture data comprising one or more of image content, video content, audio content (e.g., for video), media capture context information, and any other media-capture related data. The messaging client 140 may be empowered by a client device, such as by an operating system of the client device, to access the media capture device 160—as may be mediated by operating system application programming interfaces (APIs)—and capture media content.

The messaging client 140 may comprise a user interface component 150. The user interface component 150 may be generally arranged to provide interfaces to the functionality of the messaging client 140. For instance, the user interface component 150 may provide interfaces to media capture, media retrieval, and other media functions. The user interface component 150 may provide interfaces to message viewing, message composition, message sending, and other messaging functions. In general, the user interface component 150 may provide interfaces for any functionality of the messaging client 140.

Determining the selection of a control, area, or other element of a user interface may comprise receiving an interrupt, API call, signal, or other indication from an interface library and/or operating system of a client device. The user interface component 150 may be operative to receive user interface interactions from the operating system and to translate these user interface interactions into the activation of various user interface elements. In some embodiments, various user interface elements may be registered with an interface library and/or operating system, with the interface library and/or operating system providing user interface interactions in reference to particular user interface elements.

The messaging client 140 may comprise a messaging component 155. The messaging component 155 may be generally arranged to provide messaging services to a user of the client device. Messaging services may comprise the reception of messages, the sending of messages, the maintenance of a history of messages exchanged, and other messaging-related activities. User of the messaging client 140 may be empowered to engage in messaging conversations with a plurality of other users in both private user-to-user conversations, in private group conversations between three or more users, and in public conversations generally open to the messaging community. The messaging component 155 may expose this functionality to the user using the user interface component 150.

The user interface component 150 may be generally arranged to empower a user of the messaging client 140 to configure a media composition. A media composition may correspond to one or more media items (e.g., still images, animated images, video, audio, text), such as an individual media item or a plurality of media items in combination. The user interface component 150 may be generally arranged to empower a user to request the distribution of the media composition to a media composition distribution group for the user. The messaging component 155 may transmit the media composition via a messaging system in response to a user request to distribute the media composition, with the media composition embodied in a media composition package 185. In some embodiments, a media composition package 185 may reference one or more media items using references, such as to avoid the bandwidth cost of a transmission of the one or more media items where they are already available as a network-accessible resource to the messaging system and/or a recipient client device 190.

The media distribution system 100 may interact with messaging servers from among a plurality of messaging servers, such as messaging server 180. A messaging server 180 may operate as an intermediary between the messaging endpoints of users of the media distribution system 100. Messaging servers may track the current network address of a user's active messaging endpoint or endpoints, such as they change network (e.g., a mobile client device moving between Wi-Fi networks, between cellular data networks, and between Wi-Fi and cellular data networks). Messaging servers may queue messages for messaging endpoints when they are offline or otherwise not accepting new messages. Messaging servers may provide an ordering on messages for a particular user so as to provide consistency in the flow of communication between the potentially multiple messaging endpoints that a user might use. Messaging servers may store a messaging history for each user so as to provide access to previously-sent or received messages for a user. The messaging history may include media exchanged between users using the media distribution system 100.

Messages transmitted via the messaging server 180 may include one or more media items. Where a media item for transmission is already stored on the messaging server 180 or on a media server accessible to the media distribution system 100 the messaging server 180 may refrain from transmitting the media item to the client device. Where a media item is represented as a uniform resource locator (URL) to a network-accessible source, the immediate transmission of a media item as part of a media package may be avoided. These techniques may serve to reduce the bandwidth used in sharing media items. By using the unified platform of the media distribution system 100, the bandwidth usage of sharing media items may be reduced as the media configuration system 110 has visibility into the network locations of network-accessible media items and may store media items from a plurality of media application sources using hashing to eliminate duplicate transmissions. This reduction of bandwidth usage may increase the speed of media sharing, reduce the usage of a user's bandwidth allocation from a cellular provider, and eliminate the battery usage that may be involved in performing the upload of a application item, thereby reducing the overall battery usage for media sharing.

A media item may be managed and manipulated by the media distribution system 100 according to a variety of techniques in various embodiments. In some cases, the media item may be directly stored as computer data representation within a media package. For example, an image media item may be stored as a Joint Photographic Expert Group (JPEG) digital image file within a media package. In other cases, the media item may be stored as a reference within a media package, the reference comprising a resource locator—such as a URL—providing a network-accessible address for the media item. As such, while the messaging client 140 may retrieve and cache an instance of the media item on the client device for local access, the media item may be received using the resource locator so as to avoid using excessive bandwidth in its transmission. It will be appreciated that, in general, any known technique for formatting and storing media content may be used.

The media distribution system 100 may use knowledge generated from interactions in between users. The media distribution system 100 may comprise a component of a social-networking service and may use knowledge generated from the broader interactions of the social-networking service. As such, to protect the privacy of the users of the media distribution system 100 and the larger social-networking service, media distribution system 100 may include an authorization server (or other suitable component(s)) that allows users to opt in to or opt out of having their actions logged by the media distribution system 100 or shared with other systems (e.g., third-party systems), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers or other authorization components may be used to enforce one or more privacy settings of the users of the media distribution system 100 and other elements of a social-networking service through blocking, data hashing, anonymization, or other suitable techniques as appropriate. For example, while interactions between users of a social-networking service and the social-networking service may be used to learn media content preferences and the relationship between preferences for different pieces of media content, these interactions may be anonymized prior to or as part of the learning process.

Figure 2:
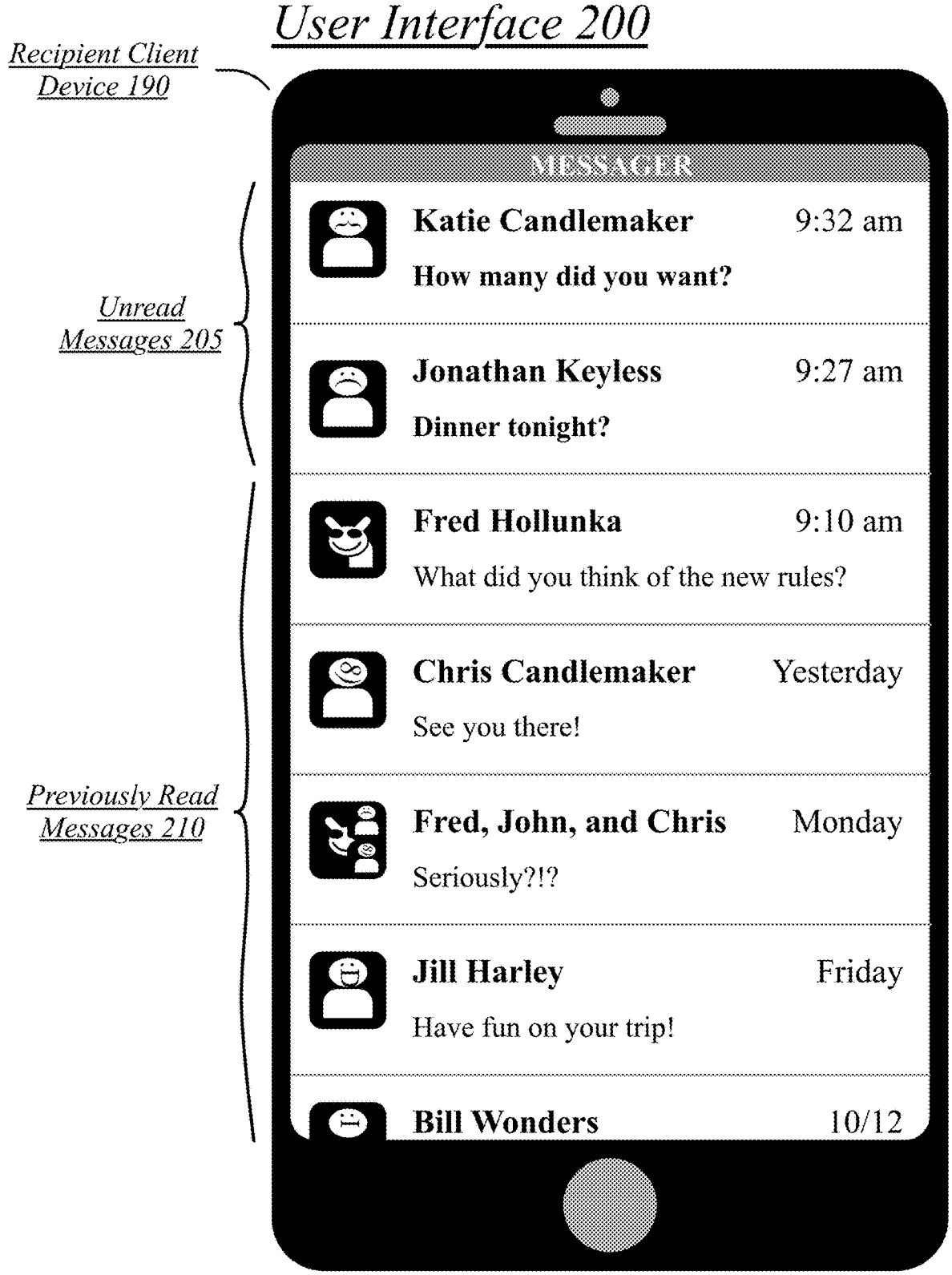
FIG. 2 illustrates an embodiment of a user interface for a messaging client.

FIG. 2 illustrates an embodiment of a user interface 200 for a messaging client.

The illustrated embodiment may comprise a user interface 200 displayed on a recipient client device 190. The user interface 200 may correspond to a messaging mailbox, messaging inbox, or other visual representation of a collection of messages received by a user of the recipient client device 190. Messages may be organized by threads, with each entry in the user interface 200 corresponding to a particular thread. A thread may correspond to a particular collection of messages, wherein at any particular point in time the thread is associated with a particular group of users, such as a pair of users in a one-on-one thread or three or more users in a group thread. Each thread may be visually associated with one or more user avatars corresponding to one or more participants in the thread other than the one associated with the recipient client device 190.

Some portion of the displayed messages may comprise unread messages 205, which have not yet been read by the user of the recipient client device 190. Some portion of the messages may comprise previously read messages 210, which have previously been read by the user of the recipient client device 190. A record of whether a message has been read or has not been read may be maintained consistently for a user across different client devices by a messaging system, such that reading a message on any device marks the message as read on every device.

Figure 3A:
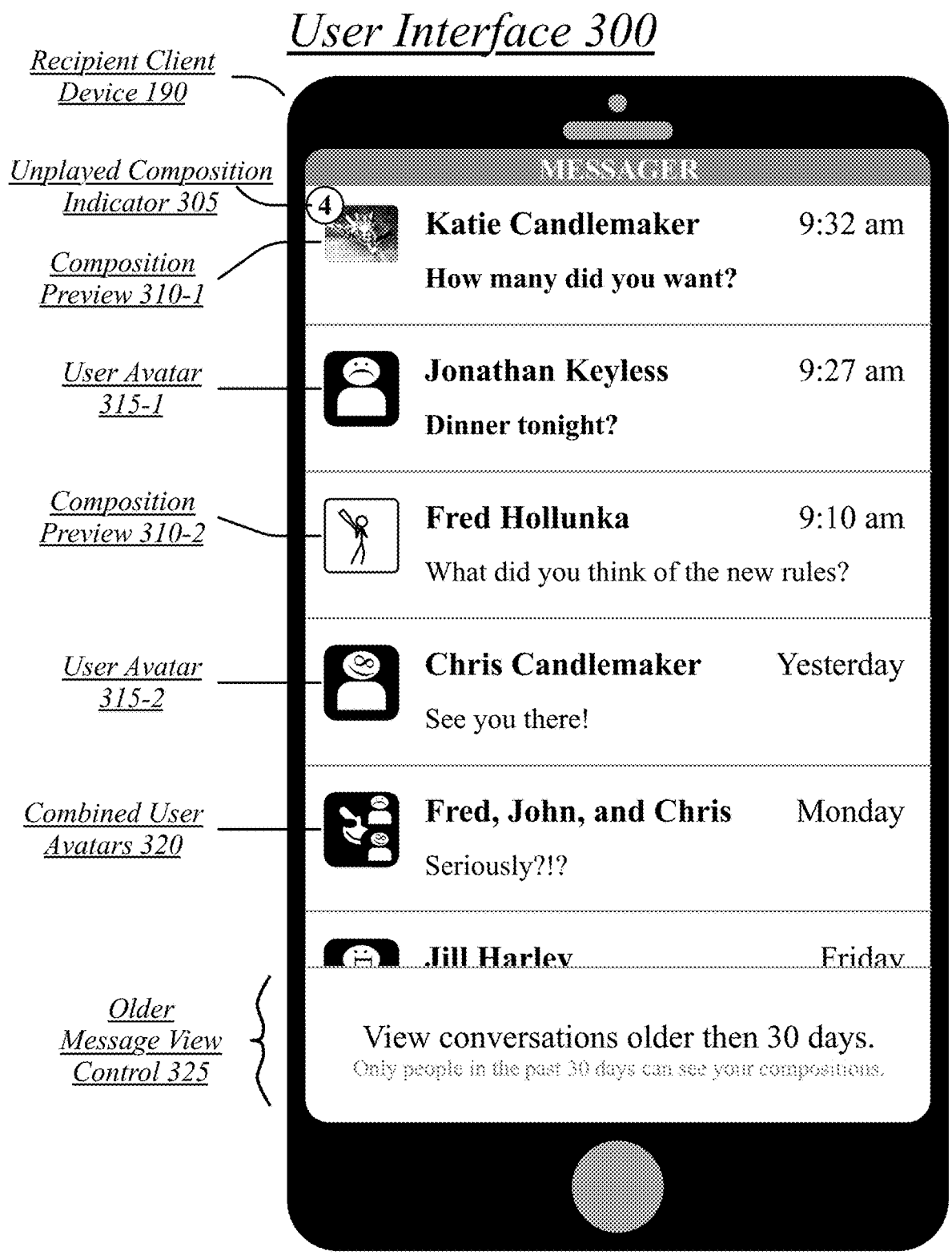
FIG. 3A illustrates an embodiment of a user interface for a messaging client displaying composition availability in an inbox.

FIG. 3A illustrates an embodiment of a user interface 300 for a messaging client displaying composition availability in an inbox. The user interface 300 may generally correspond to the user interface 200 with additional elements communicating composition information.

In some embodiments, media compositions may have a limited availability, such as twenty-four hours, one week, thirty days, etc. Further, in some cases, some users may refrain from generating compositions. As such, some users may have available compositions and some users may not have available compositions.

Each message thread may be displayed in association with a visual identifier indicating the one or more users, other than the user for which the user interface 300 is being displayed, with whom the message thread is associated. These users correspond to the users that would receive a message if the user of the recipient client device 190 were to transmit a message to that message thread. Where a message thread is associated with an individual other user the visual identifier may comprise a user avatar assigned to the other user's user account as their avatar, such as through a manual selection by the other user of the avatar to associate with their account. Where a message thread is associated with a plurality of other users the visual identifier may comprise a combination of two or more of their user avatars. Each thread may be additionally associated with one or more names of the one or more other users, an indicator of the time of a most-recent interaction in the message thread, and/or an extracted portion of the message thread, such as some or all of the most-recent message sent, received, and/or exchanged (i.e., either sent or received) in the message thread.

Where a message thread is associated with an individual user, and as such an individual user avatar, and that user has an available composition, that user avatar may be replaced by a preview of that available composition to indicate the availability of the composition. Where one or more compositions are available, the preview may be displayed in associated with an indicator indicating the number of compositions available for that user. Where no composition is available, no preview may be displayed, and as such a user avatar may be displayed as normal.

In the illustrated embodiment of FIG. 3A, two user avatars 315 are displayed to indicate that their associated users have no available composition. Two compositions previews 310 are displayed to indicate that their associated users have an available composition and to provide a preview of at least one of an available one or more compositions. A combined user avatar 320 is displayed, wherein that composition previews may only be associated with individual message thread and not used in association with group threads. An unread composition indicator 305 is displayed in association, and in proximity, to the composition preview 310-1 for a first message thread to indicate that one or more—in this case four—compositions are available that have not yet been played by the user of the recipient client device 190. In contrast, the composition preview 310-2 for a second message thread is displayed without an associated unplayed composition indicator to indicate that all of the available compositions for the second message thread have already been played by the user of the recipient client device 190. In the illustrated embodiment, the unread composition indicator 305 indicates the number of unplayed media compositions. However, in other embodiments, the unread composition indicator 305 may be a general symbol indicating that one or more unplayed media compositions are available without the number of unplayed media compositions, such as by overlaying a play symbol on top of a composition preview where the composition preview is of a media composition that is unplayed by the user of the recipient client device 190.

A composition preview for an image may comprise a resized version of that image. A composition preview for a video may comprise an initial frame or other representative frame of the video. A composition preview for an audio media item may comprise an icon indicating audio media. Various techniques for compositions previews may be used.

Where a user has only a single available composition that single available composition may be used for the composition preview. Where a user has a plurality of available compositions a particular composition may be selected for the composition preview. Where a user has one or more available compositions that have not been played back for the receiving user, the most recent unplayed available composition may be used for the composition preview. Where a use has no available composition that have not been played back for the receiving user—where a receiving user has played all of the available compositions—the most recent available composition may be used for the composition preview.

A user interface 300 may comprise an older message view control 325. The old message view control 325 may empower access to message threads older than a predefined period. Selecting the older message view control 325 may instantiate a user interface to view the older message threads. In some embodiments, compositions may only be available to user with a recent messaging relationship, with recency determined according to a threshold period of time, such as thirty days. In these embodiments, the threshold for message threads being organized into an older message thread section may be set to be the same as the threshold for messaging relationship recency, so that the presence of an active message thread in the primary message thread section indicates that the other user(s) may be or are part of the receiving audience for compositions and that the other user(s) may be or are users for whom the receiving user of the recipient client device 190 may receive compositions.

Figure 3B:
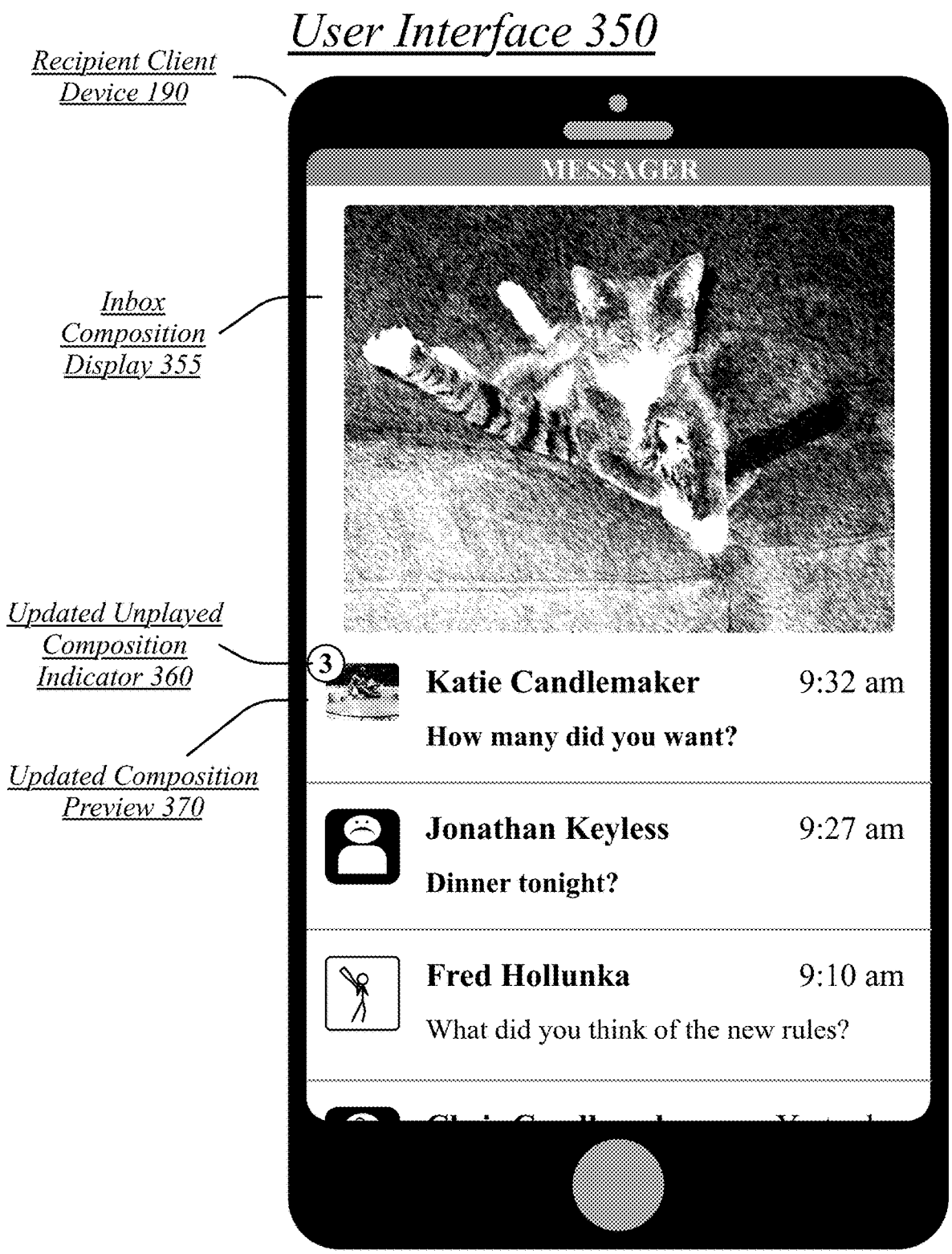
FIG. 3B illustrates an embodiment of a user interface for a messaging client displaying a composition in an inbox.

FIG. 3B illustrates an embodiment of a user interface 350 for a messaging client displaying a composition in an inbox.

The user interface 350 may comprise an inbox composition display 355 initiated in response to a user selecting to play a media composition. A user may, for instance, select a composition preview, with the selection of the composition preview initiating play of the previewed media composition as an inbox composition display 355: viewing of a larger version of an image composition, audio playback of an audio composition, video playback of a video composition, etc. The composition may be played in the inbox interface when selected in the inbox interface.

Due to one of the unviewed compositions being played, the number of unplayed compositions has decreased. As such, an updated unplayed composition indicator 360 may be displayed in association with the message thread with which the media composition of inbox composition display 355 is associated, the updated unplayed composition indicator 360 indicating the change in the number of unplayed available media compositions. Similarly, the previous composition preview 310-1 may be replaced by an updated composition preview 370, the updated composition preview 370 indicating the next unplayed available media composition for the user associated with that message thread, as the media composition previously previewed has now been played or is in the process of being played.

In some embodiments, where multiple unplayed media compositions are available, they may automatically play in sequence. In other embodiments, each media composition will only be played if individually selected. In some embodiments, where unplayed media compositions are available for a plurality of users, they may automatically play in sequence. In some embodiments, an inbox display may comprise a notification that one or more unplayed media compositions haven't been viewed and are about to expire.

Figure 3C:
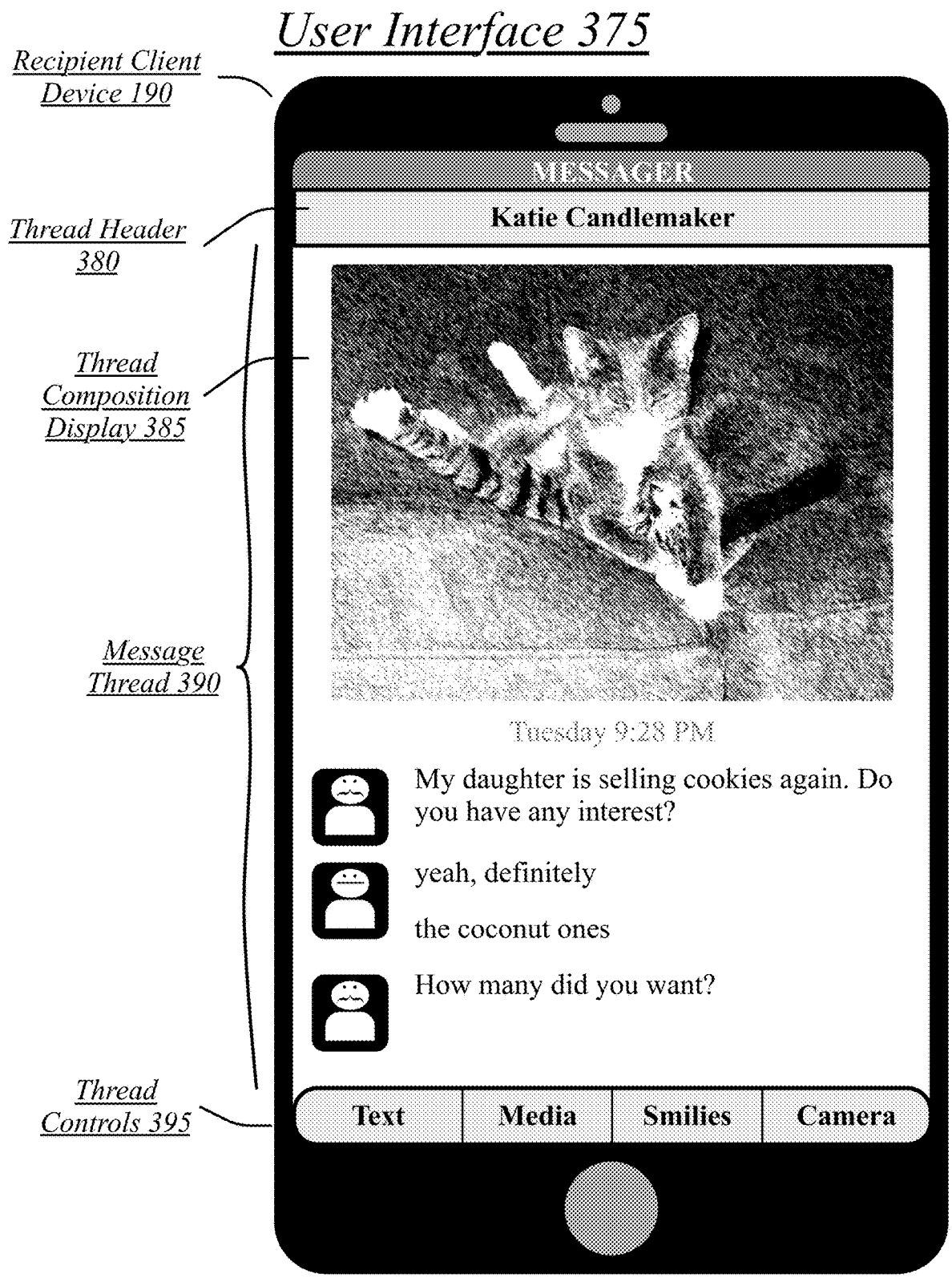
FIG. 3C illustrates an embodiment of a user interface for a messaging client displaying a composition in a message thread.

FIG. 3C illustrates an embodiment of a user interface 375 for a messaging client displaying a composition in a message thread 390.

The message thread 390 may, without limitation, be reached by the user by selecting that message thread in an inbox view, such as illustrated in FIG. 3A. The message thread 390 may be displayed in associated with a thread header 380 identifier the other user associated with the message thread 390. The message thread 390 may be displayed in association with thread controls 395 empowering the activation of an interface for entering text, selecting media, selecting smilies (e.g., emoticons, emoji), activating a device camera, or other messaging controls. When in the message thread 390, the other user's user avatar may be used instead of a media composition preview.

In some embodiments, selecting a message thread 390 may automatically initiate a thread composition display 385 of one or more unplayed media compositions. In these embodiments, any unplayed media compositions may be played in sequence, such as from newest to oldest. In other embodiments, the one or more media compositions may only be played if specifically selected by the user.

Figure 4A:
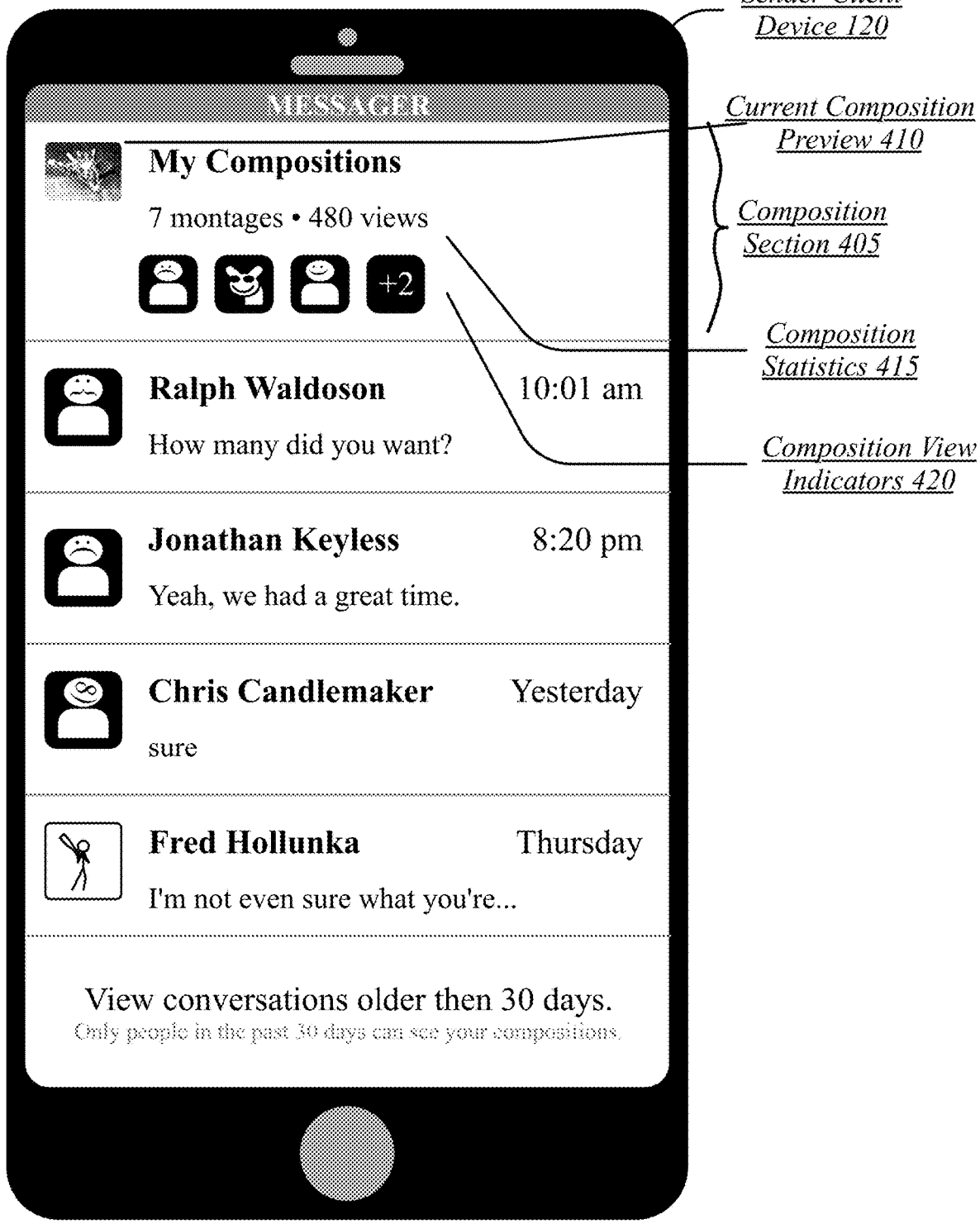
FIG. 4A illustrates an embodiment of a user interface for a messaging client displaying a composition section.

FIG. 4A illustrates an embodiment of a user interface 400 for a messaging client displaying a composition section.

A composition section 405 may be displayed at the top of the inbox for each user of the messaging system. The composition section 405, if activated, may empower the selection or creation of media compositions for distribution to the media composition distribution group for the user. The composition section 405 may further empower a view of the media compositions already distributed by the user of the sender client device 120.

The composition section 405 may comprise a current composition preview 410 providing a preview of the most-recent available media composition for the user of a sender client device 120. The composition section 405 may comprise composition statistics 415 indicating statistics associated with the user's media compositions, such as the number of media compositions they currently have available and the total number of composition views their compositions have received. The composition section 405 may comprise one or more composition view indicators 420 indicating which users have viewed the most recent media composition, or all of the available media compositions, of the user of the sender client device 120. Composition view indicators 420 may indicate that a user has viewed the composition or compositions through the presence of the viewing user's user avatar. In some cases, only a portion of the user avatars may be displayed, with the others indicated through the presence of a general indicator that additional users have viewed the composition(s).

Figure 4B:
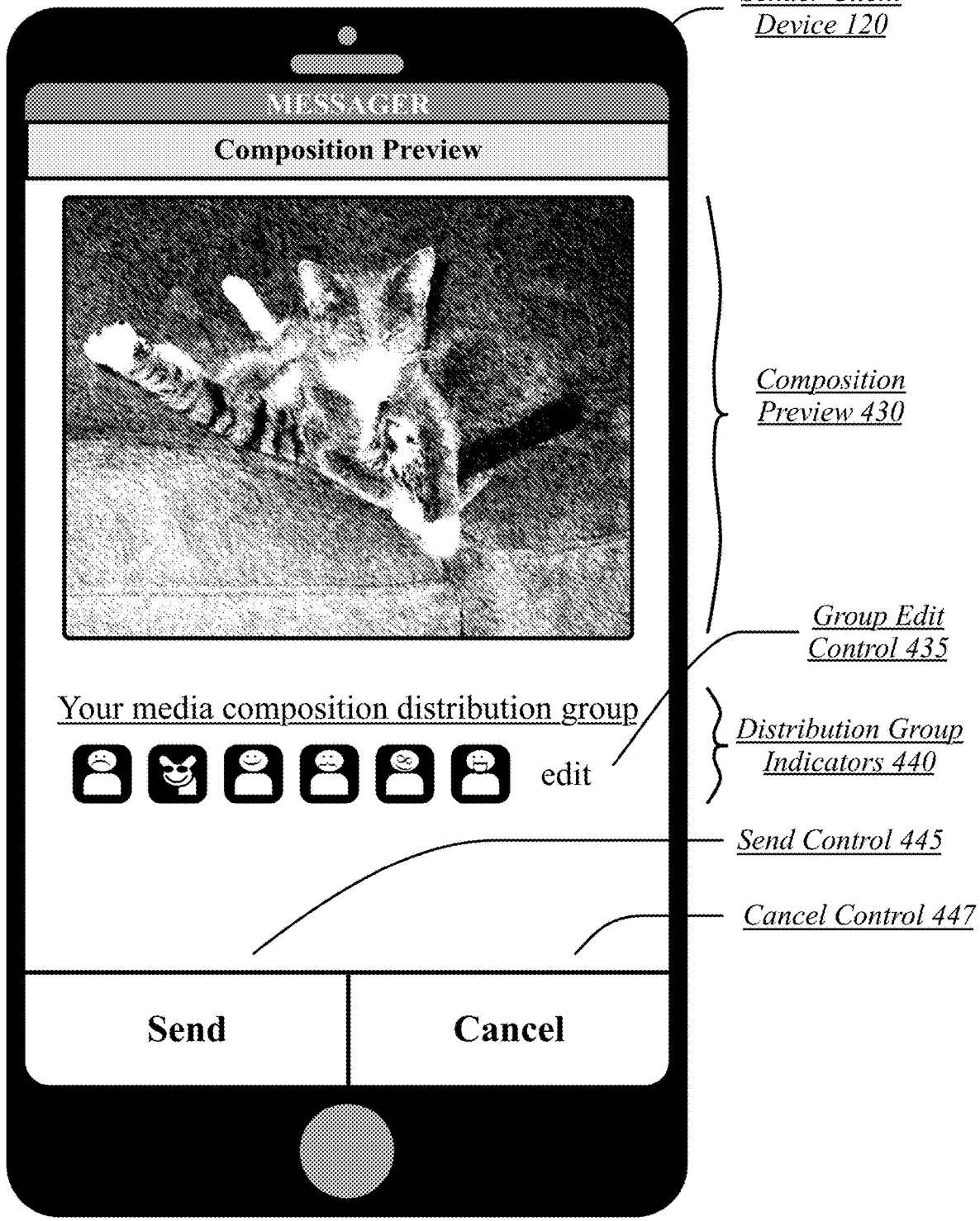
FIG. 4B illustrates an embodiment of a user interface for a messaging client displaying a composition interface.

FIG. 4B illustrates an embodiment of a user interface for a messaging client displaying a composition interface.

A composition interface may comprise a plurality of user interface elements arranged to inform the user of the sender client device 120 about a composition available for distribution. A composition interface may include a composition preview 430, the composition preview 430 providing a view to the user of the sender client device 120 as to how a composition would appear to a receiving user. Where a media composition has a playback element that involves an extent of time (e.g., a video item, an audio item, an animated image) the composition preview 430 may be played for the user, either automatically or on demand in response to a user command.

A composition interface may comprise a visual display of the media composition distribution group. A composition interface may comprise a distribution group display comprising a plurality of distribution group indicators 440. A distribution group indicator may comprise an avatar or other visual indicator distinctly indicating a particular user of a messaging system. The plurality of distribution group indicators 440 may jointly indicate the distribution group for the user of the sender client device 120. In some instances, each member of the distribution group may be represented by a distinct visual indicator. In some instances, such as where a membership size of the distribution group exceeds a threshold defined by a quantity of layout space allocated to the distribution group indicators 440, only a portion of the distribution group membership may be displayed with a remaining portion indicated by a general indicator indicating the number of additional members of the distribution group. In some embodiments, in these instances, selecting a general indicator indicating the number of additional members may show these additional members and/or may transition the composition interface to a view of the complete membership of the distribution group. The distribution group indicators 440 may be displayed in association with a group edit control 435, the group edit control 435 empowering modification of the membership of the media distribution group.

A composition interface may comprise a send control 445, the send control 445 empowering the user of the composition interface to send the media composition to their associated media distribution group. The messaging component 155 may be operative to transmit the media composition to the media distribution group in response to a user selection of the send control 445.

A composition interface may comprise a cancel control 447, the cancel control 447 empowering the user of the composition interface to reject the sending of the media composition. The user interface component 150 may be operative to return the user to a previous user interface state in response to a user selection of the cancel control 447 without sending the media composition.

In some cases, a composition interface may be displayed as an overlay rather than a full-screen interface as depicted in FIG. 4B. For instance, in a media view interface, a composition interface may be invoked that is overlaid on top of the media view in a portion of the screen space.

In some cases, a composition interface may comprise a preview and controls for distribution to a plurality of channels. For example, a composition interface may preview the distribution of a media item as a media composition to a media distribution group and/or a messaging of the media item to a message thread and/or a posting of the media item to a profile, such as for distribution to a friend group in a social-network service.

Figure 5:
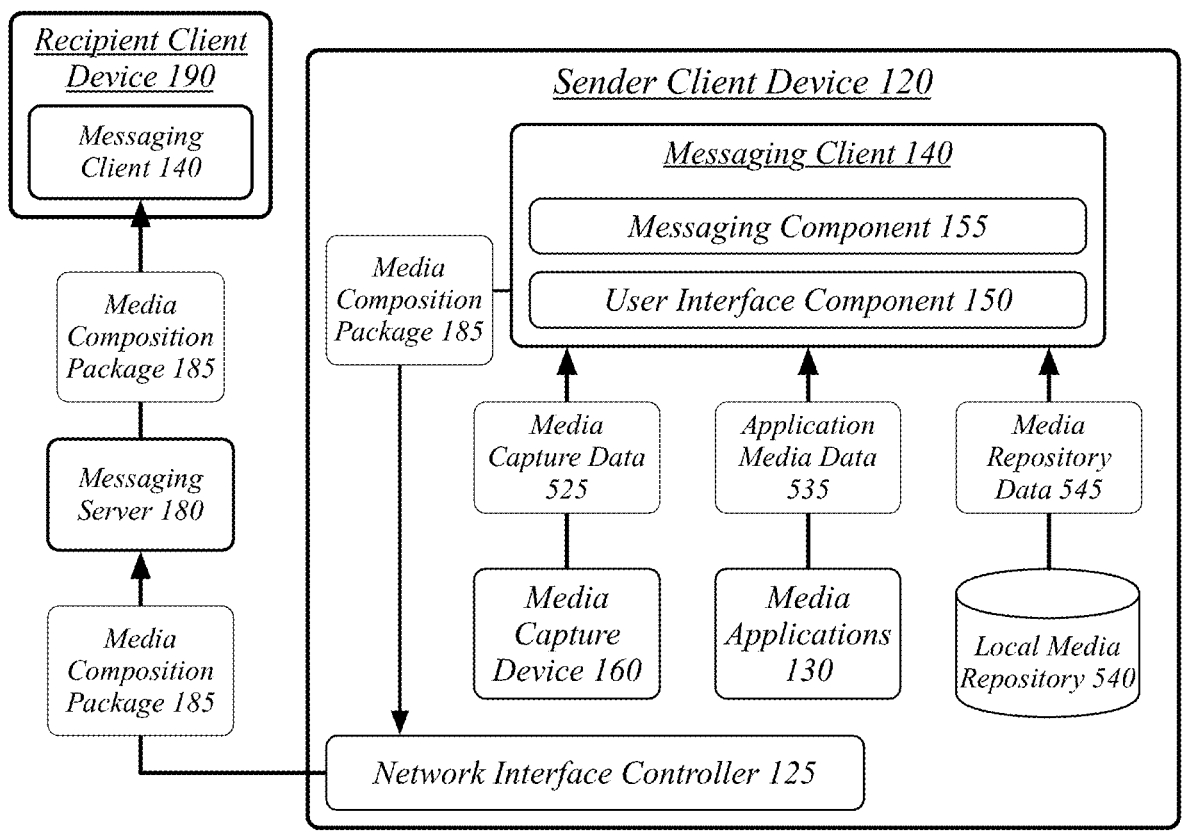
FIG. 5 illustrates an embodiment of a media composition generation and distribution by a media distribution system.

FIG. 5 illustrates an embodiment of a media composition generation and distribution by a media distribution system 100.

A sender client device 120 and recipient client device 190 may each execute a messaging client 140. The messaging client 140 may comprise a user interface component 150 and a messaging component 155. The messaging client 140 may empower the users of the sender client device 120 and the recipient client device 190 to exchange, without limitation, media compositions. Media compositions may be exchanged via the network transmission of media composition packages.

An installation of the messaging client 140 on the sender client device 120 may be associated with a first user account with a messaging system, the instance of the messaging client 140 on the sender client device 120 registered with the messaging system—such as through an authentication process providing authentication credentials to the messaging client 140—as being associated with a user account for the user of the sender client device 120. Similarly, an installation of the messaging client 140 on the recipient client device 190 may be associated with a second user account with the messaging system, the instance of the messaging client 140 on the recipient client device 190 registered with the messaging system as being associated with a user account for the user of the recipient client device 190.

A user interface component 150 of a messaging client 140 on a sender client device 120 may be generally arranged to receive a media composition via a composition interface. A composition interface may comprise any user interface displaying a proposed or possible media composition in association with one or more controls for the distribution of a media composition to a media composition distribution group.

In one instance, a composition interface may be initiated from a media selection interface for a local media repository 540 on the sender client device 120. The messaging client 140 may retrieve media repository data 545 from the local media repository 540 and present one or more local media items to the user. A local media repository 540 may include, at least, a camera roll for the sender client device 120, such that a distributed media composition comprises a photo from the camera roll. A user may select one or more media items from the local media repository 540 and be empowered to transmit the one or more media items to a media composition distribution group.

In another instance, a composition interface may be initiated from a media selection interface for media from one or more media applications 130 on the sender client device 120. A messaging client 140 may provide access to media content collected from a plurality of media applications 130 and present the application media content to the user, empowering the user to select one or more media items for distribution as a media composition. A user may select one or more media items from the plurality of media application 130 and be empowered to transmit the one or more media items to a media composition distribution group.

In another instance, a composition interface may be initiated from a media capture interface for the sender client device 120. A media capture interface may comprise a portion of the messaging client 140, may comprise a portion of the operating system, or may comprise a portion of another application or utility of the sender client device 120.

The messaging client 140 may be operative to invoke a composition interface in response to media being captured being the sender client device 120, the composition interface offering the user to use the captured media as a media composition for distribution to their media composition distribution group. A user may select the capture media as a media composition, be transferred to the composition interface, and be empowered to transmit the captured media item to a media composition distribution group. As such, the user interface component 150 may detect a user photo capture on the sender client device 120, instantiate a detected photo capture interface element in response to detecting the user photo capture, receive an activation of the detected photo capture interface, and instantiate the composition interface in response to receiving the activation of the detected photo capture interface. In some cases, the user photo capture may comprise a photo capture performed by the messaging client. In other cases, the user photo capture may comprise a photo captured performance by a distinct application from the messaging client, the user photo capture detected based on a camera roll for the client device. For instance, the messaging client 140 may be operative to examine the camera roll of the client device for new media captures upon activation.

The user interface component 150 may be generally arranged to receive a transmission command via the composition interface and to initiate the transmission of the media composition based on the reception of the transmission command. The messaging component 1550 may be generally arranged to transmit a media composition package 185 from the client device to the messaging system via a network interface controller 125 in response to the transmission command, the media composition package 185 comprising the media composition. The media composition package 185 may be transmitted as a message submission to the messaging system. The media composition package 185 may be addressed to a media composition distribution group for the user account associated with the messaging client 140 on the sender client device 120. Transmitting the media composition package 185 to the messaging system may comprise transmitting the media composition package 185 to a messaging server 180 for the messaging system.

The messaging server 180 may receive the media composition package 185 and add it to a queue for one or more destination user accounts, the one or more destination user accounts comprising the media composition distribution group for the user account for the user of the sender client device 120. The messaging server 180 may transmit the media composition package 185 to recipient client devices. The transmission of the media composition package 185 to the recipient client devices may be performed using push techniques, in which the messaging server 180 initiates contact with a recipient client device 190. Alternatively, the transmission of the media composition package 185 to the recipient client devices may be performed on request, in which the messaging server 180 transmits the media composition package 185 to a recipient client device 190 when messaging updates are requested by the messaging client 140 on the recipient client device 190.

On the recipient client device 190, the user interface component 150 may display a messaging interface in association with a recipient user account with a messaging system, the messaging interface comprising a visual indicator for a sender user account with the messaging system. The visual indicator may comprise a media composition availability indicator, the media composition availability indicator associated with an inclusion of the recipient user account in a media composition distribution group for the sender user account. The user interface component 150 may receive a user selection of the media composition availability indicator in the messaging interface. The messaging component 155 may receive a media composition package associated with the sender user account, the media composition package comprising a media composition. The user interface component 150 may display the media composition in response to the user selection of the media composition availability indicator. The media composition availability indicator may comprise at least in part a preview of the media composition. The media composition may comprise one or more of an image item, video item, and sound item. The user interface component 150 may determine a plurality of available media compositions for the sender user account and select the media composition as a most-recent-unread media composition of the plurality of available media compositions. The user interface component 150 may replace the media composition availability indicator with a user avatar for the sender user account in response to displaying the media composition.

The recipient client device 190 may receiving the media composition package 185, the media composition package 185 associated with the user account for the sender client device 120, the media composition package 185 comprising the media composition. In some embodiments, the media composition package 185 may not contain a full-quality version of the media composition and may instead contain a reference to the media composition and/or a previous of the media composition. In these embodiments, the full-quality version of the media composition may only be downloaded when playback of it is requested by the user of the recipient client device 190. In some embodiments, the recipient client device 190 may download a full-quality version of media compositions when on a Wi-Fi or other non-metered network and only delay the downloading of the full-quality version when on a cellular network or other metered network.

A media composition distribution group may be determined based on, at least in part, a messaging history for the user account with the messaging system. In some embodiments, the media composition distribution group may automatically include all users and only those users with which the sending user has an active messaging relationship. An active messaging relationship for a sending user may be any messaging relationship in which the sending user has sent the receiving user at least one message and in which at least one message has been exchanged, with either user as the sender, without a period of interruption since the sending user sent a message greater than a predefined period, such as thirty days. A receiving user may be automatically added to the media distribution group upon the sending user sending a message to the receiving user. A receiving user may be maintained in the media distribution group so long as either of the sending user or receiving user sends a message to the other without a period of time between messages exceeding the predefined period. In another embodiment, a receiving user may only be maintained in the media distribution group so long as the sending user sends a message to the receiving user within the predefined period. In another embodiment, merely sending a message to a user may provide access to the messaged user's media compositions.

Group conversations may be addressed according to a variety of techniques. In a first embodiment, group conversations may not have an impact on the membership or the suggested membership of the media composition distribution group, due to the lack of clarity in a group conversation as to whether two users are sufficiently engaged in each other to be considered sufficient associates as to warrant the distribution of media compositions. In a second embodiment, a message sent to a group conversation may be treated as being sent to every other member of the group conversation in regards to membership or the suggested membership of the media composition distribution group. In a third embodiment, a message sent to a group conversation may be treated as being sent to every other member of the group conversation in regards to continuation of membership of the media composition distribution group but not used to initiate membership or suggested membership of the media composition distribution group.

The media distribution group may be defined at either of the messaging client 140 or a messaging server 180 associated with the messaging system. Where a media distribution group is defined at the messaging client 140 any changes may be transmitted to the messaging system.

The media distribution system 100 may detect a message sent from the sender user account to a destination user account, the destination user account not in the media composition distribution group and include the destination user account in the media composition distribution group automatically based on detecting the message sent from the user account to the destination user account.

The media distribution system 100 may detect that the user account and the destination user account haven't messaged within a defined recency, the destination user account in the media composition distribution group. The defined recency may correspond to the predefined period, such as by being thirty days. The media distribution system 100 may remove the destination user account from the media composition distribution group automatically based on detecting that the user account and the destination user account haven't messaged within the defined recency.

In some cases, the media distribution system 100 may encourage the sending user to maintain a messaging relationship with a receiving user in order to maintain the receiving user's membership in the media distribution group and therefore the receiving user's access to the sending user's media compositions. The media distribution group 100 may detect that the sending user account and the destination user account haven't messaged within a defined recency, the destination user account in the media composition distribution group, and promote messaging engagement with the destination user account in response to detecting that the user account and the destination user account haven't messaged within the defined recency. Promoting messaging engagement may comprise displaying an alert, notification, or other message to the user of the sender client device 120 advising the sending user that they haven't engaged with the destination user account for a particular period of time, reminding the sending user that if a messaging relationship isn't maintained with the defined recency that the destination user account will stop having access to message compositions by the sending user, and, in some embodiments, offering immediate access to a message thread for the destination user account, such as through an instantiation of a message thread access control. The defined recency for this reminder may comprise a reminder defined recency of a shorter length than a group maintenance defined recency so as to promote the maintenance of a messaging relationship before access to media compositions lapses.

Similarly, the media distribution system 100 may encourage the receiving user to maintain a messaging relationship with a sending user in order to maintain the receiving user's membership in the media distribution group and therefore the receiving user's access to the sending user's media compositions. The media distribution system 100 may detect that the sending user account and the receiving user account haven't messaged within a defined recency and promote messaging engagement with the sending user account in response to detecting that the sending user account and the receiving user account haven't messaged within the defined recency. Promoting messaging engagement may comprise displaying an alert, notification, or other message to the user of the recipient client device 190 advising the recipient user that they haven't engaged with the sender user account for a particular period of time, reminding the recipient user that if a messaging relationship isn't maintained with the defined recency that the recipient user account will stop having access to message compositions by the sender user account, and, in some embodiments, offering immediate access to a message thread for the sender user account, such as through an instantiation of a message thread access control. The defined recency for this reminder may comprise a reminder defined recency of a shorter length than a group maintenance defined recency so as to promote the maintenance of a messaging relationship before access to media compositions lapses.

In another embodiment, membership in the media distribution group may be manually configured with suggestions provided by the media distribution system 100 based on, at least in part, a messaging history for the user account with the messaging system. In general, any change described herein in regards to automatic addition or removal of membership in the media composition distribution group may instead be applied as suggestions to the user of the sender client device 120. In some embodiments, changes to the membership of a user's media composition distribution group may be automatically applied, with the user being further empowered to manually make changes to the membership, including adding members, removing members, banning users from membership, and locking users into membership independent of the messaging relationship.

The media distribution system 100 may detect a message sent from the user account to a destination user account, the destination user account not in the media composition distribution group, and suggest the destination user account for inclusion in the media composition distribution group based on detecting the message sent from the user account to the destination user account. Suggesting the destination user account for inclusion in the media composition distribution group may comprise the instantiation of a user interface and/or user interface element proposing the inclusion of the destination user account. The user interface component 150 may receive an approval of the proposal of the inclusion of the destination user account and add the destination user account to the media composition distribution group in response.

The media distribution system 100 may detect that the user account and the destination user account haven't messaged within a defined recency, the destination user account in the media composition distribution group, and suggest the destination user account for removal from the media composition distribution group based on detecting that the user account and the destination user account haven't messaged within the defined recency. Suggesting the destination user account for inclusion in the media composition distribution group may comprise the instantiation of a user interface and/or user interface element proposing the removal of the destination user account. The user interface component 150 may receive an approval of the proposal of the removal of the destination user account and remove the destination user account from the media composition distribution group in response.

The media distribution system 100 may collect replies to all media compositions by all users in a central location, whether these replies are textual or other media items. The media distribution system 100 may receive a reply to the media composition from a destination user account and add the reply to the media composition to a reply trophy case, the reply trophy case shared across all media composition replies for the user account. The reply trophy case may be displayed in the messaging client 140 in a reply trophy case interface, such as upon selection of a reply trophy case view control. When a recipient user sends a response to a media composition, the messaging component 150 on the recipient client device 190 may transmit a read notification for the media composition to the messaging system, the read notification addressed to a reply trophy case for the sender user account.

In some embodiments, media compositions may expire after a period of time. An expiration period may be defined, after which a media composition is removed from availability. The expiration period may be predefined for all media compositions, such as twenty-four hours. A timer for the expiration may be started once the media composition is transmitted by the sending user. At the extinction of the time, after the passage of the expiration period, the media composition may be removed from availability by the media distribution system 100, as may be enforced by a messaging system, including the messaging system 180 and/or a recipient client device 190.

Included herein is a set of flow charts representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

FIG. 6A illustrates one embodiment of a logic flow 600. The logic flow 600 may be representative of some or all of the operations executed by one or more embodiments described herein.

In the illustrated embodiment shown in FIG. 6, the logic flow 600 may receive a media composition via a composition interface of a messaging client on a client device, the messaging client associated with a user account with a messaging system at block 602.

The logic flow 600 may receive a transmission command via the composition interface at block 604.

The logic flow 600 may transmit a media composition package from the client device to the messaging system in response to the transmission command, the media composition package comprising the media composition, the media composition package addressed to a media composition distribution group for the user account at block 606.

The embodiments are not limited to this example.

FIG. 6B illustrates one embodiment of a logic flow 650. The logic flow 650 may be representative of some or all of the operations executed by one or more embodiments described herein.

In the illustrated embodiment shown in FIG. 6, the logic flow 650 may display a messaging interface in association with a first user account with a messaging system, the messaging interface comprising a visual indicator for a second user account with the messaging system, the visual indicator comprising a media composition availability indicator, the media composition availability indicator associated with an inclusion of the first user account in a media composition distribution group for the second user account at block 652.

The logic flow 650 may receive a user selection of the media composition availability indicator in the messaging interface at block 654.

The logic flow 650 may receive a media composition package associated with the second user account, the media composition package comprising a media composition at block 656.

The logic flow 650 may display the media composition in response to the user selection of the media composition availability indicator at block 658.

The embodiments are not limited to this example.

Figure 7:
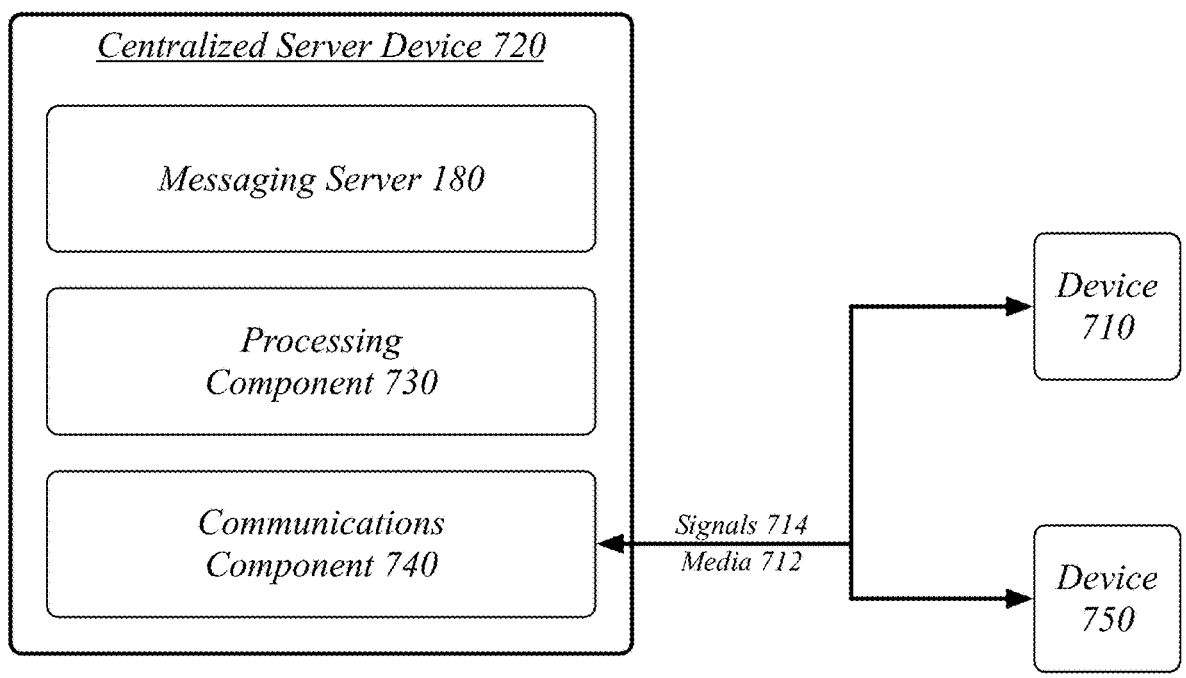
FIG. 7 illustrates an embodiment of a centralized system for the system of FIG. 1.

FIG. 7 illustrates a block diagram of a centralized system 700. The centralized system 700 may implement some or all of the structure and/or operations for the media distribution system 100 in a single computing entity, such as entirely within a single centralized server device 720.

The centralized server device 720 may comprise any electronic device capable of receiving, processing, and sending information for the media distribution system 100. Examples of an electronic device may include without limitation an ultra-mobile device, a mobile device, a personal digital assistant (PDA), a mobile computing device, a smart phone, a telephone, a digital telephone, a cellular telephone, ebook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, subscriber station, mobile subscriber center, radio network controller, router, hub, gateway, bridge, switch, machine, or combination thereof. The embodiments are not limited in this context.

The centralized server device 720 may execute processing operations or logic for the media distribution system 100 using a processing component 730. The processing component 730 may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The centralized server device 720 may execute communications operations or logic for the media distribution system 100 using communications component 740. The communications component 740 may implement any well-known communications techniques and protocols, such as techniques suitable for use with packet-switched networks (e.g., public networks such as the Internet, private networks such as an enterprise intranet, and so forth), circuit-switched networks (e.g., the public switched telephone network), or a combination of packet-switched networks and circuit-switched networks (with suitable gateways and translators). The communications component 740 may include various types of standard communication elements, such as one or more communications interfaces, network interfaces, network interface cards (NIC), radios, wireless transmitters/receivers (transceivers), wired and/or wireless communication media, physical connectors, and so forth. By way of example, and not limitation, communication media 712 includes wired communications media and wireless communications media. Examples of wired communications media may include a wire, cable, metal leads, printed circuit boards (PCB), backplanes, switch fabrics, semiconductor material, twisted-pair wire, co-axial cable, fiber optics, a propagated signal, and so forth. Examples of wireless communications media may include acoustic, radio-frequency (RF) spectrum, infrared and other wireless media.

The centralized server device 720 may communicate with other devices 710, 750 over a communications media 712 using communications signals 714 via the communications component 740. The devices 710, 750 may be internal or external to the centralized server device 720 as desired for a given implementation.

The centralized system 700 may correspond to an embodiment in which a single messaging server 180 is used executing on a single centralized server device 720. The devices 710, 750 may correspond to client devices—such as sender client device 120 and recipient client device 190—using the messaging server 180 for messaging services.

Figure 8:
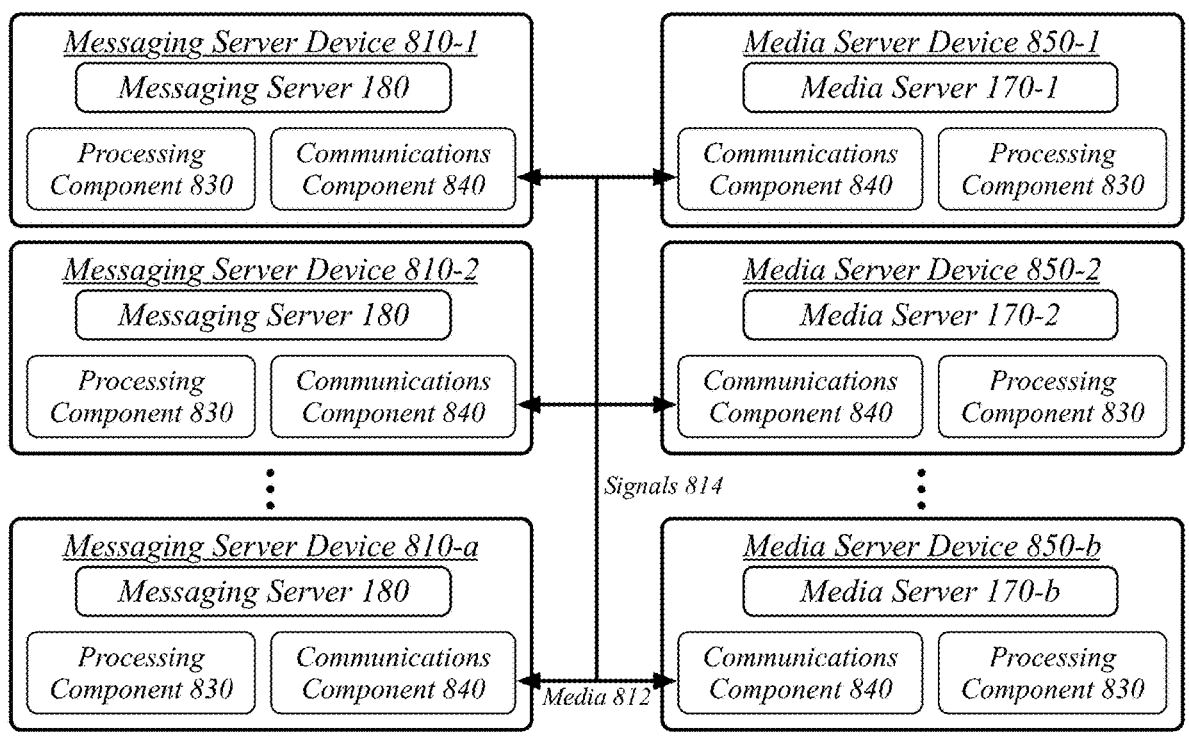
FIG. 8 illustrates an embodiment of a distributed system for the system of FIG. 1.

FIG. 8 illustrates a block diagram of a distributed system 800. The distributed system 800 may distribute portions of the structure and/or operations for the media distribution system 100 across multiple computing entities. Examples of distributed system 800 may include without limitation a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

The distributed system 800 may comprise a plurality of messaging server devices 810 and a plurality of media server devices 850. In general, the server devices 810, 850 may be the same or similar to the centralized server device 720 as described with reference to FIG. 7. For instance, the server devices 810, 850 may each comprise a processing component 830 and a communications component 840 which are the same or similar to the processing component 730 and the communications component 740, respectively, as described with reference to FIG. 7. In another example, the server devices 810, 850 may communicate over a communications media 812 using communications signals 814 via the communications components 840.

The plurality of messaging server devices 810 may comprise or employ one or more server programs that operate to perform various methodologies in accordance with the described embodiments. In one embodiment, for example, the plurality of messaging server devices 810 may collectively implement the messaging server 180 as a distributed messaging server 180. Each of the messaging server devices 810 may execute a messaging server 180 to collectively provide messaging services to the users of the media distribution system 100.

The plurality of media server devices 850 may comprise or employ one or more server programs that operate to perform various methodologies in accordance with the described embodiments. In one embodiment, for example, the plurality of media server devices 850 may implement the media servers 170.

Figure 9:
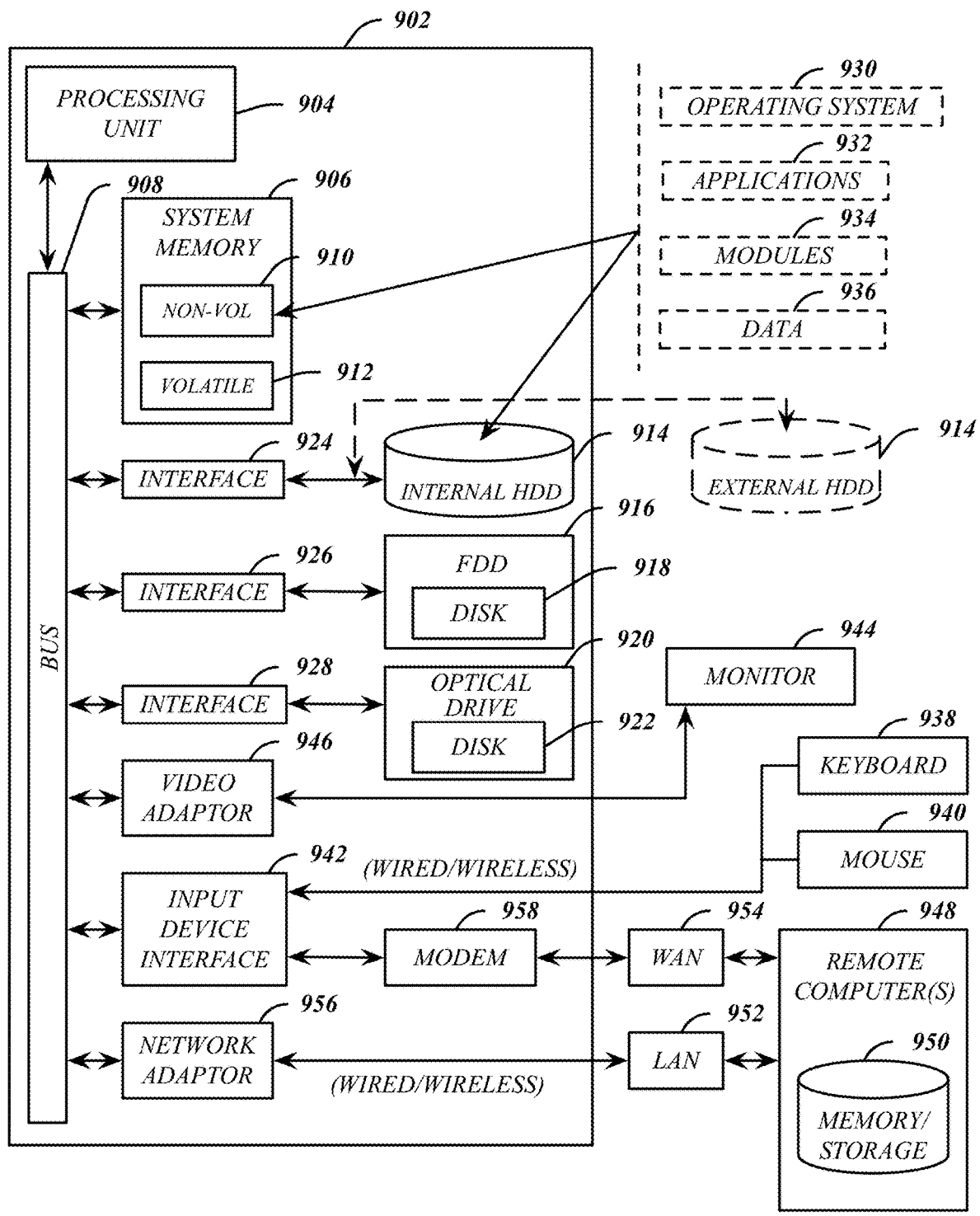
FIG. 9 illustrates an embodiment of a computing architecture.

FIG. 9 illustrates an embodiment of an exemplary computing architecture 900 suitable for implementing various embodiments as previously described. In one embodiment, the computing architecture 900 may comprise or be implemented as part of an electronic device. Examples of an electronic device may include those described with reference to FIG. 1, 5, 7, 8, among others. The embodiments are not limited in this context.

As used in this application, the terms "system" and "component" are intended to refer to a computer-related entity, either hardware, a combination of hardware and software, software, or software in execution, examples of which are provided by the exemplary computing architecture 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 900 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 900.

As shown in FIG. 9, the computing architecture 900 comprises a processing unit 904, a system memory 906 and a system bus 908. The processing unit 904 can be any of various commercially available processors, including without limitation an Athlon®, Duron® and Opteron® processors; embedded and secure processors; DragonBall® and PowerPC® processors; Cell processors; Celeron®, Core (2) Duo®, Itanium®, Pentium®, Xeon®, and XScale® processors; and similar processors. Dual microprocessors, multi-core processors, and other multi-processor architectures may also be employed as the processing unit 904.

The system bus 908 provides an interface for system components including, but not limited to, the system memory 906 to the processing unit 904. The system bus 908 can be any of several types of bus structure that may further interconnect to a memory bus (with or without a memory controller), a peripheral bus, and a local bus using any of a variety of commercially available bus architectures. Interface adapters may connect to the system bus 908 via a slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 900 may comprise or implement various articles of manufacture. An article of manufacture may comprise a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 906 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 9, the system memory 906 can include non-volatile memory 910 and/or volatile memory 912. A basic input/output system (BIOS) can be stored in the non-volatile memory 910.

The computer 902 may include various types of computer-readable storage media in the form of one or more lower speed memory units, including an internal (or external) hard disk drive (HDD) 914, a magnetic floppy disk drive (FDD) 916 to read from or write to a removable magnetic disk 918, and an optical disk drive 920 to read from or write to a removable optical disk 922 (e.g., a CD-ROM or DVD). The HDD 914, FDD 916 and optical disk drive 920 can be connected to the system bus 908 by a HDD interface 924, an FDD interface 926 and an optical drive interface 928, respectively. The HDD interface 924 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 910, 912, including an operating system 930, one or more application programs 932, other program modules 934, and program data 936. In one embodiment, the one or more application programs 932, other program modules 934, and program data 936 can include, for example, the various applications and/or components of the media distribution system 100.

A user can enter commands and information into the computer 902 through one or more wire/wireless input devices, for example, a keyboard 938 and a pointing device, such as a mouse 940. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, trackpads, sensors, styluses, and the like. These and other input devices are often connected to the processing unit 904 through an input device interface 942 that is coupled to the system bus 908, but can be connected by other interfaces such as a parallel port, IEEE 1394 serial port, a game port, a USB port, an IR interface, and so forth.

A monitor 944 or other type of display device is also connected to the system bus 908 via an interface, such as a video adaptor 946. The monitor 944 may be internal or external to the computer 902. In addition to the monitor 944, a computer typically includes other peripheral output devices, such as speakers, printers, and so forth.

The computer 902 may operate in a networked environment using logical connections via wire and/or wireless communications to one or more remote computers, such as a remote computer 948. The remote computer 948 can be a workstation, a server computer, a router, a personal computer, portable computer, microprocessor-based entertainment appliance, a peer device or other common network node, and typically includes many or all of the elements described relative to the computer 902, although, for purposes of brevity, only a memory/storage device 950 is illustrated. The logical connections depicted include wire/wireless connectivity to a local area network (LAN) 952 and/or larger networks, for example, a wide area network (WAN) 954. Such LAN and WAN networking environments are commonplace in offices and companies, and facilitate enterprise-wide computer networks, such as intranets, all of which may connect to a global communications network, for example, the Internet.

When used in a LAN networking environment, the computer 902 is connected to the LAN 952 through a wire and/or wireless communication network interface or adaptor 956.

The adaptor 956 can facilitate wire and/or wireless communications to the LAN 952, which may also include a wireless access point disposed thereon for communicating with the wireless functionality of the adaptor 956.

When used in a WAN networking environment, the computer 902 can include a modem 958, or is connected to a communications server on the WAN 954, or has other means for establishing communications over the WAN 954, such as by way of the Internet. The modem 958, which can be internal or external and a wire and/or wireless device, connects to the system bus 908 via the input device interface 942. In a networked environment, program modules depicted relative to the computer 902, or portions thereof, can be stored in the remote memory/storage device 950. It will be appreciated that the network connections shown are exemplary and other means of establishing a communications link between the computers can be used.

The computer 902 is operable to communicate with wire and wireless devices or entities using the IEEE 802 family of standards, such as wireless devices operatively disposed in wireless communication (e.g., IEEE 802.9 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 802.9x (a, b, g, n, etc.) to provide secure, reliable, fast wireless connectivity. A Wi-Fi network can be used to connect computers to each other, to the Internet, and to wire networks (which use IEEE 802.3-related media and functions).

Figure 10:
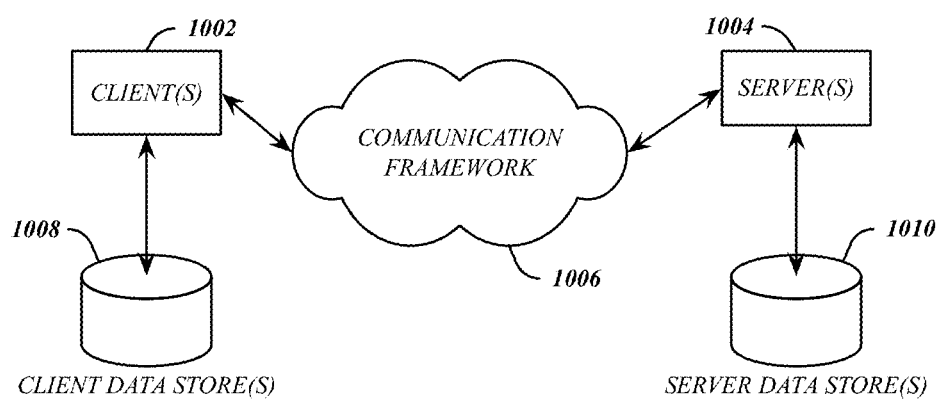
FIG. 10 illustrates an embodiment of a communications architecture.

FIG. 10 illustrates a block diagram of an exemplary communications architecture 1000 suitable for implementing various embodiments as previously described. The communications architecture 1000 includes various common communications elements, such as a transmitter, receiver, transceiver, radio, network interface, baseband processor, antenna, amplifiers, filters, power supplies, and so forth. The embodiments, however, are not limited to implementation by the communications architecture 1000.

As shown in FIG. 10, the communications architecture 1000 comprises includes one or more clients 1002 and servers 1004. The clients 1002 may implement the client devices 120, 190, 710, 750. The servers 1004 may implement the messaging server devices 810. The clients 1002 and the servers 1004 are operatively connected to one or more respective client data stores 1008 and server data stores 1010 that can be employed to store information local to the respective clients 1002 and servers 1004, such as cookies and/or associated contextual information.

The clients 1002 and the servers 1004 may communicate information between each other using a communication framework 1006. The communications framework 1006 may implement any well-known communications techniques and protocols. The communications framework 1006 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 1006 may implement various network interfaces arranged to accept, communicate, and connect to a communications network. A network interface may be regarded as a specialized form of an input output interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.11a-x network interfaces, IEEE 802.16 network interfaces, IEEE 802.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 1002 and the servers 1004. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

Figure 11:
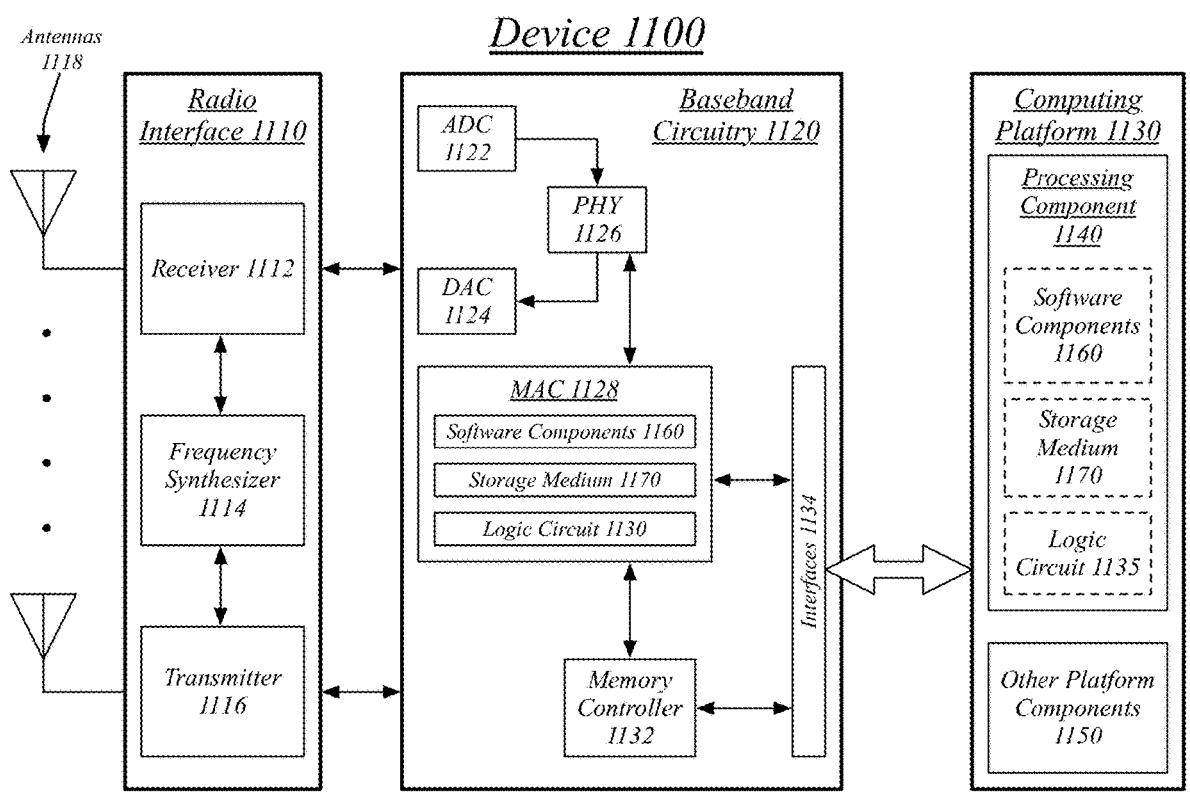
FIG. 11 illustrates an embodiment of a radio device architecture.

FIG. 11 illustrates an embodiment of a device 1100 for use in a multicarrier OFDM system, such as the media distribution system 100. Device 1100 may implement, for example, software components 1160 as described with reference to media distribution system 100 and/or a logic circuit 1135. The logic circuit 1135 may include physical circuits to perform operations described for the media distribution system 100. As shown in FIG. 11, device 1100 may include a radio interface 1110, baseband circuitry 1120, and computing platform 1130, although embodiments are not limited to this configuration.

The device 1100 may implement some or all of the structure and/or operations for the media distribution system 100 and/or logic circuit 1135 in a single computing entity, such as entirely within a single device. Alternatively, the device 1100 may distribute portions of the structure and/or operations for the media distribution system 100 and/or logic circuit 1135 across multiple computing entities using a distributed system architecture, such as a client-server architecture, a 3-tier architecture, an N-tier architecture, a tightly-coupled or clustered architecture, a peer-to-peer architecture, a master-slave architecture, a shared database architecture, and other types of distributed systems. The embodiments are not limited in this context.

In one embodiment, radio interface 1110 may include a component or combination of components adapted for transmitting and/or receiving single carrier or multi-carrier modulated signals (e.g., including complementary code keying (CCK) and/or orthogonal frequency division multiplexing (OFDM) symbols) although the embodiments are not limited to any specific over-the-air interface or modulation scheme.

Radio interface 1110 may include, for example, a receiver 1112, a transmitter 1116 and/or a frequency synthesizer 1114. Radio interface 1110 may include bias controls, a crystal oscillator and/or one or more antennas 1118. In another embodiment, radio interface 1110 may use external voltage-controlled oscillators (VCOs), surface acoustic wave filters, intermediate frequency (IF) filters and/or RF filters, as desired. Due to the variety of potential RF interface designs an expansive description thereof is omitted.

Baseband circuitry 1120 may communicate with radio interface 1110 to process receive and/or transmit signals and may include, for example, an analog-to-digital converter 1122 for down converting received signals, a digital-to-analog converter 1124 for up converting signals for transmission. Further, baseband circuitry 1120 may include a baseband or physical layer (PHY) processing circuit 1156 for PHY link layer processing of respective receive/transmit signals. Baseband circuitry 1120 may include, for example, a processing circuit 1128 for medium access control (MAC)/data link layer processing. Baseband circuitry 1120 may include a memory controller 1132 for communicating with processing circuit 1128 and/or a computing platform 1130, for example, via one or more interfaces 1134.

In some embodiments, PHY processing circuit 1126 may include a frame construction and/or detection module, in combination with additional circuitry such as a buffer memory, to construct and/or deconstruct communication frames, such as radio frames. Alternatively or in addition, MAC processing circuit 1128 may share processing for certain of these functions or perform these processes independent of PHY processing circuit 1126. In some embodiments, MAC and PHY processing may be integrated into a single circuit.

The computing platform 1130 may provide computing functionality for the device 1100. As shown, the computing platform 1130 may include a processing component 1140. In addition to, or alternatively of, the baseband circuitry 1120, the device 1100 may execute processing operations or logic for the media distribution system 100 and logic circuit 1135 using the processing component 1140. The processing component 1140 (and/or PHY 1126 and/or MAC 1128) may comprise various hardware elements, software elements, or a combination of both. Examples of hardware elements may include devices, logic devices, components, processors, microprocessors, circuits, processor circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

The computing platform 1130 may further include other platform components 1150. Other platform components 1150 include common computing elements, such as one or more processors, multi-core processors, co-processors, memory units, chipsets, controllers, peripherals, interfaces, oscillators, timing devices, video cards, audio cards, multimedia input/output (I/O) components (e.g., digital displays), power supplies, and so forth. Examples of memory units may include without limitation various types of computer readable and machine readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EEPROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information.

Device 1100 may be, for example, an ultra-mobile device, a mobile device, a fixed device, a machine-to-machine (M2M) device, a personal digital assistant (PDA), a mobile computing device, a smart phone, a telephone, a digital telephone, a cellular telephone, user equipment, eBook readers, a handset, a one-way pager, a two-way pager, a messaging device, a computer, a personal computer (PC), a desktop computer, a laptop computer, a notebook computer, a netbook computer, a handheld computer, a tablet computer, a server, a server array or server farm, a web server, a network server, an Internet server, a work station, a minicomputer, a main frame computer, a supercomputer, a network appliance, a web appliance, a distributed computing system, multiprocessor systems, processor-based systems, consumer electronics, programmable consumer electronics, game devices, television, digital television, set top box, wireless access point, base station, node B, evolved node B (eNB), subscriber station, mobile subscriber center, radio network controller, router, hub, gateway, bridge, switch, machine, or combination thereof. Accordingly, functions and/or specific configurations of device 1100 described herein, may be included or omitted in various embodiments of device 1100, as suitably desired. In some embodiments, device 1100 may be configured to be compatible with protocols and frequencies associated one or more of the 3GPP LTE Specifications and/or IEEE 1102.16 Standards for WMANs, and/or other broadband wireless networks, cited herein, although the embodiments are not limited in this respect.

Embodiments of device 1100 may be implemented using single input single output (SISO) architectures. However, certain implementations may include multiple antennas (e.g., antennas 1118) for transmission and/or reception using adaptive antenna techniques for beamforming or spatial division multiple access (SDMA) and/or using MIMO communication techniques.

The components and features of device 1100 may be implemented using any combination of discrete circuitry, application specific integrated circuits (ASICs), logic gates and/or single chip architectures. Further, the features of device 1100 may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

It should be appreciated that the exemplary device 1100 shown in the block diagram of FIG. 11 may represent one functionally descriptive example of many potential implementations. Accordingly, division, omission or inclusion of block functions depicted in the accompanying figures does not infer that the hardware components, circuits, software and/or elements for implementing these functions would be necessarily be divided, omitted, or included in embodiments.

A computer-implemented method may comprise receiving a media composition via a composition interface of a messaging client on a client device, the messaging client associated with a user account with a messaging system; receiving a transmission command via the composition interface; and transmitting a media composition package from the client device to the messaging system in response to the transmission command, the media composition package comprising the media composition, the media composition package addressed to a media composition distribution group for the user account.

A computer-implemented method may further comprise detecting a user photo capture on the client device; instantiating a detected photo capture interface element in response to detecting the user photo capture; receiving an activation of the detected photo capture interface; and instantiating the composition interface in response to receiving the activation of the detected photo capture interface.

A computer-implemented method may further comprise the user photo capture comprising a photo capture performed by the messaging client.

A computer-implemented method may further comprise the user photo capture comprising a photo captured performance by a distinct application from the messaging client, the user photo capture detected based on a camera roll for the client device.

A computer-implemented method may further comprise the composition interface comprising a visual display of the media composition distribution group.

A computer-implemented method may further comprise the media composition distribution group determined based on, at least in part, a messaging history for the user account with the messaging system.

A computer-implemented method may further comprise detecting a message sent from the user account to a destination user account, the destination user account not in the media composition distribution group; and including the destination user account in the media composition distribution group automatically based on detecting the message sent from the user account to the destination user account.

A computer-implemented method may further comprise detecting that the user account and the destination user account haven't messaged within a defined recency, the destination user account in the media composition distribution group; and removing the destination user account from the media composition distribution group automatically based on detecting that the user account and the destination user account haven't messaged within the defined recency.

A computer-implemented method may further comprise detecting a message sent from the user account to a destination user account, the destination user account not in the media composition distribution group; and suggesting the destination user account for inclusion in the media composition distribution group based on detecting the message sent from the user account to the destination user account.

A computer-implemented method may further comprise detecting that the user account and the destination user account haven't messaged within a defined recency, the destination user account in the media composition distribution group; and suggesting the destination user account for removal from the media composition distribution group based on detecting that the user account and the destination user account haven't messaged within the defined recency.

A computer-implemented method may further comprise detecting that the user account and the destination user account haven't messaged within a defined recency, the destination user account in the media composition distribution group; and promoting messaging engagement with the destination user account in response to detecting that the user account and the destination user account haven't messaged within the defined recency.

A computer-implemented method may further comprise receiving a reply to the media composition from a destination user account; and adding the reply to the media composition to a reply trophy case, the reply trophy case shared across all media composition replies for the user account.

An apparatus may comprise a processor circuit on a client device; a network interface controller on the client device; a user interface component of a messaging client on a client device operative on the processor circuit to receive a media composition via a composition interface, the messaging client associated with a user account with a messaging system; and receive a transmission command via the composition interface; and a messaging component operative on the processor circuit to transmit a media composition package from the client device to the messaging system via the network interface controller in response to the transmission command, the media composition package comprising the media composition, the media composition package addressed to a media composition distribution group for the user account. The apparatus may be operative to implement any of the computer-implemented methods described herein.

A computer-implemented method may comprise displaying a messaging interface in association with a first user account with a messaging system, the messaging interface comprising a visual indicator for a second user account with the messaging system, the visual indicator comprising a media composition availability indicator, the media composition availability indicator associated with an inclusion of the first user account in a media composition distribution group for the second user account; receiving a user selection of the media composition availability indicator in the messaging interface; receiving a media composition package associated with the second user account, the media composition package comprising a media composition; and displaying the media composition in response to the user selection of the media composition availability indicator.

A computer-implemented method may further comprise the media composition comprising one or more of an image item, video item, and sound item.

A computer-implemented method may further comprise detecting a message sent from the second user account to the first user account, the first user account not in the media composition distribution group; and including the first user account in the media composition distribution group automatically based on detecting the message sent from the second user account to the first user account.

A computer-implemented method may further comprise detecting that the first user account and the second destination user account haven't messaged within a defined recency; and removing the first user account from the media composition distribution group automatically based on detecting that the first user account and the second user account haven't messaged within the defined recency.

A computer-implemented method may further comprise detecting that the first user account and the second user account haven't messaged within a defined recency; and promoting messaging engagement with the second user account in response to detecting that the first user account and the second user account haven't messaged within the defined recency.

A computer-implemented method may further comprise transmitting a read notification for the media composition to the messaging system, the read notification addressed to a reply trophy case for the second user account.

A computer-implemented method may further comprise determining a plurality of available media compositions for the second user account; and selecting the media composition as a most-recent-unread media composition of the plurality of available media compositions.

A computer-implemented method may further comprise replacing the media composition availability indicator with a user avatar for the second user account in response to displaying the media composition.

A computer-implemented method may further comprise the media composition availability indicator comprising at least in part a preview of the media composition.

An apparatus may comprise a processor circuit on a client device; a network interface controller on the client device; a user interface component operative on the processor circuit to display a messaging interface in association with a first user account with a messaging system, the messaging interface comprising a visual indicator for a second user account with the messaging system, the visual indicator comprising a media composition availability indicator, the media composition availability indicator associated with an inclusion of the first user account in a media composition distribution group for the second user account; receive a user selection of the media composition availability indicator in the messaging interface; and display a media composition in response to the user selection of the media composition availability indicator; and a messaging component operative on the processor circuit to receive a media composition package associated with the first user account via the network interface controller, the media composition package comprising the media composition. The apparatus may be operative to implement any of the computer-implemented methods described herein.

At least one computer-readable storage medium may comprise instructions that, when executed, cause a system to perform any of the computer-implemented methods described herein.

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

With general reference to notations and nomenclature used herein, the detailed descriptions herein may be presented in terms of program procedures executed on a computer or network of computers. These procedural descriptions and representations are used by those skilled in the art to most effectively convey the substance of their work to others skilled in the art.

A procedure is here, and generally, conceived to be a self-consistent sequence of operations leading to a desired result. These operations are those requiring physical manipulations of physical quantities. Usually, though not necessarily, these quantities take the form of electrical, magnetic or optical signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to those quantities.

Further, the manipulations performed are often referred to in terms, such as adding or comparing, which are commonly associated with mental operations performed by a human operator. No such capability of a human operator is necessary, or desirable in most cases, in any of the operations described herein which form part of one or more embodiments. Rather, the operations are machine operations. Useful machines for performing operations of various embodiments include general purpose digital computers or similar devices.

Various embodiments also relate to apparatus or systems for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove convenient to construct more specialized apparatus to perform the required method steps. The required structure for a variety of these machines will appear from the description given.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodologies, but one of ordinary skill in the art may recognize that many further combinations and permutations are possible. Accordingly, the novel architecture is intended to embrace all such alterations, modifications and variations that fall within the spirit and scope of the appended claims.

What is claimed is:

1. A computer-implemented method, comprising:
    displaying, in a messaging interface on a client device associated with a user, a plurality of message threads, each message thread comprising an avatar of one or more other users in the message thread;
    replacing, in a one-on-one message thread with a sending user, the avatar of the sending user, displayed as a first icon in a portion of the message thread at a first location, with a media composition availability indicator, indicating that the sending user has published one or more media compositions to a distribution group of which the user is a member, displayed as a second icon in the portion of the message thread at the first location, wherein the media composition availability indicator comprises a preview of one of the one or more media compositions;
    receiving a user-selection of the media composition availability indicator; and
    displaying one of the one or more media compositions in the messaging interface.

2. The method of claim 1 further comprising:
    displaying, in the media composition availability indicator, an indicator of the number of media compositions distributed by the sending user that remain unviewed by the user.

3. The method of claim 1 further comprising:
    replacing the preview of the one media composition with a preview of another of the one or more media compositions when the one media composition has been viewed by the user.

4. The method of claim 3 further comprising:
    replacing the preview of the one media composition with the avatar of the sending user when all of the one or more media compositions published by the sending user have been viewed by the user.

5. The method of claim 1 wherein displaying the one media composition further comprises:
    displaying the one media composition in the messaging interface with the plurality of message threads.

6. The method of claim 1 wherein displaying the one media composition further comprises:
    transitioning the messaging interface to a display of the message thread associated with the one media composition;
    displaying one or more messages comprising the message thread; and
    displaying the one media composition in the messaging interface with the one or more messages.

7. An apparatus, comprising:
    a processor circuit on a client device;
    a user interface component operative on the processor circuit to:
        display a messaging interface on a client device associated with a user, the message interface including a plurality of message threads, each message thread comprising an avatar of one or more other users in the message thread;
        replace, in a one-on-one message thread with a sending user, the avatar of the sending user, displayed as a first icon in a portion of the message thread at a first location, with a media composition availability indicator, indicating that the sending user has published one or more media compositions to a distribution group of which the user is a member, displayed as a second icon in the portion of the message thread at the first location, wherein the media composition availability indicator comprises a preview of one of the one or more media compositions;
        receive a user-selection of the media composition availability indicator; and
        display one of the one or more media compositions in the messaging interface.

8. The apparatus of claim 7 wherein the user interface component is further operative to:
    display, in the media composition availability indicator, an indicator of the number of media compositions distributed by the sending user that remain unviewed by the user.

9. The apparatus of claim 7 wherein the user interface component is further operative to:
    replace the preview of the one media composition with a preview of another of the one or more media compositions when the one media composition has been viewed by the user.

10. The apparatus of claim 9 wherein the user interface component is further operative to:
    replace the preview of the one media composition with the avatar of the sending user when all of the one or more media compositions published by the sending user have been viewed by the user.

11. The apparatus of claim 7 wherein the user interface component is further operative to:
    display the one media composition in the messaging interface with the plurality of message threads.

12. The apparatus of claim 7 wherein the user interface component is further operative to:
    transition the messaging interface to a display of the message thread associated with the one media composition;
    display one or more messages comprising the message thread; and
    display the one media composition in the messaging interface with the one or more messages.

13. A non-transitory computer-readable storage medium comprising instructions that, when executed, cause a system to:
    display, in a messaging interface on a client device associated with a user, a plurality of message threads, each message thread comprising an avatar of one or more other users in the message thread;
    replace, in a one-on-one message thread with a sending user, the avatar of the sending user, displayed as a first icon in a portion of the message thread at a first location, with a media composition availability indicator, indicating that the sending user has published one or more media compositions to a distribution group of which the user is a member, displayed as a second icon in the portion of the message thread at the first location, wherein the media composition availability indicator comprises a preview of one of the one or more media compositions;
    receive a user-selection of the media composition availability indicator; and
    display one of the one or more media compositions in the messaging interface.

14. The medium of claim 13, the instructions further causing the system to:
    display, in the media composition availability indicator, an indicator of the number of media compositions distributed by the sending user that remain unviewed by the user.

15. The medium of claim 13, the instructions further causing the system to:
- replace the preview of the one media composition with a preview of another of the one or more media compositions when the one media composition has been viewed by the user; and
- replace the preview of the one media composition with the avatar of the sending user when all of the one or more media compositions published by the sending user have been viewed by the user.

16. The medium of claim 13, the instructions further causing the system to:
- display the one media composition in the messaging interface with the plurality of message threads.

17. The medium of claim 13, the instructions further causing the system to:
- transition the messaging interface to a display of the message thread associated with the one media composition;
- display one or more messages comprising the message thread; and
- display the one media composition in the messaging interface with the one or more messages.

\* \* \* \* \*